US012387700B2

(12) United States Patent
Moyer

(10) Patent No.: US 12,387,700 B2
(45) Date of Patent: Aug. 12, 2025

(54) SYSTEMS AND METHODS FOR SCORE AND SCREENPLAY BASED AUDIO AND VIDEO EDITING

(71) Applicant: William Frederick Moyer, Dover, NH (US)

(72) Inventor: William Frederick Moyer, Dover, NH (US)

( * ) Notice: Subject to any disclaimer, the term of this patent is extended or adjusted under 35 U.S.C. 154(b) by 771 days.

(21) Appl. No.: 17/342,059

(22) Filed: Jun. 8, 2021

(65) Prior Publication Data

US 2021/0383781 A1 Dec. 9, 2021

Related U.S. Application Data

(60) Provisional application No. 63/036,184, filed on Jun. 8, 2020.

(51) Int. Cl.
*G10H 1/00* (2006.01)

(52) U.S. Cl.
CPC ......... *G10H 1/0025* (2013.01); *G10H 1/0058* (2013.01); *G10H 2220/121* (2013.01); *G10H 2220/126* (2013.01); *G10H 2250/035* (2013.01)

(58) Field of Classification Search
CPC ............... G10H 1/0025; G10H 1/0058; G10H 2220/121; G10H 2220/126; G10H 2250/035
See application file for complete search history.

(56) References Cited

U.S. PATENT DOCUMENTS

2011/0112672 A1* 5/2011 Brown .................. G11B 27/28 700/94
2016/0012857 A1* 1/2016 Leppänen ............. G11B 27/32 386/241

FOREIGN PATENT DOCUMENTS

GB 2550090 A * 11/2017 ............ A63B 69/00
JP 2016014892 A * 1/2016 ............... G10G 1/00

* cited by examiner

*Primary Examiner* — Jianchun Qin
(74) *Attorney, Agent, or Firm* — Foley Hoag LLP; Erik A. Huestis; Sameer K. Pai

(57) ABSTRACT

Systems, methods, and computer program products for audio- and video-editing are provided. A reference file comprising a visual representation of a final audio/video project may be displayed. The visual representation can be musical notation rather than a wave form or a printed movie script rather than video content. A user may determine a first selection and the program may display a list of recordings in which at least a portion of this first selected section occurs. A user may click each line on the list to play each recording cued to the first selected section. The user may choose the best recording. The user may determine a second selection and similarly may choose the best recording of second section. Finally, the program may allow the user to splice both chosen recordings together.

19 Claims, 20 Drawing Sheets

SYSTEMS AND METHODS FOR SCORE AND SCREENPLAY BASED AUDIO AND VIDEO EDITING

CROSS-REFERENCE TO RELATED APPLICATION

This application claims the benefit of U.S. Provisional Patent Application No. 63/036,184, filed on Jun. 8, 2020, which is hereby incorporated by reference in its entirety.

BACKGROUND

Embodiments of the present disclosure relate to audio- and video-editing methods.

BRIEF SUMMARY

According to embodiments of the present disclosure, systems, methods, and computer program products for audio editing are provided. In various embodiments, a method is provided where a reference file comprising musical notation is read. A plurality of measures and a plurality of notes of the musical notation are determined. A plurality of audio recordings are read where each of the plurality of audio recordings corresponds to at least a portion of the musical notation. For each of the plurality of measures of the musical notation, a corresponding segment of at least one of the plurality of audio recordings is determined. The musical notation is displayed to a user. First selections of a measure of the plurality of measures are received from the user. For each of the first selections, a listing of the plurality of audio recordings in which at least a portion of the selected measure is played is displayed to the user. For each of the first selections, a second selection of an audio recording from the listing is received from the user thereby linking the selected measure to the corresponding segment of the selected audio recording. An audio file is generated by splicing together each of the linked segments.

In various embodiments, the reference file is a musical score. In various embodiments, determining the plurality of measures and the plurality of notes comprises performing optical music recognition on the reference file. In various embodiments, determining the plurality of measures and the plurality of notes comprises identifying a location of at least one bar and at least one staff in the reference file. In various embodiments, determining the corresponding segment of the at least one of the plurality of audio recordings comprises identifying a series of notes in the segment and searching the reference file for a matching series of notes. In various embodiments, determining the corresponding segment of the at least one of the plurality of audio recordings includes providing to the user a subset of the plurality of audio recordings in which all of the plurality of measures of the reference file are played, obtaining from the user a matching of a segment of the subset of audio recordings with each of the plurality of measures, and based on the matching, determining at least one segment of the remaining audio recordings corresponding to each of the plurality of measures. In various embodiments, each of the plurality of measures and the plurality of notes of the musical notation and the corresponding segment of at least one of the plurality of audio recordings are provided to a user via a graphical user interface. In various embodiments, the method further includes automatically playing all segments of the audio recordings corresponding to a selected measure of the notation upon selection of the measure. In various embodiments, the method further includes receiving a ranking from the user of each segment of the audio recordings corresponding to a measure of the notation. In various embodiments, generating the audio file comprises generating a crossfade between adjacent selections of the user.

In various embodiments, a system is provided including a server and a computing node including a computer readable storage medium having program instructions embodied therewith. The program instructions are executable by a processor of the computing node to cause the processor to perform a method where a reference file comprising musical notation is read. A plurality of measures and a plurality of notes of the musical notation are determined. A plurality of audio recordings are read where each of the plurality of audio recordings corresponds to at least a portion of the musical notation. For each of the plurality of measures of the musical notation, a corresponding segment of at least one of the plurality of audio recordings is determined. The musical notation is displayed to a user. First selections of a measure of the plurality of measures are received from the user. For each of the first selections, a listing of the plurality of audio recordings in which at least a portion of the selected measure is played is displayed to the user. For each of the first selections, a second selection of an audio recording from the listing is received from the user thereby linking the selected measure to the corresponding segment of the selected audio recording. An audio file is generated by splicing together each of the linked segments.

In various embodiments, a computer program product is provided including a computer readable storage medium having program instructions embodied therewith. The program instructions are executable by a processor of the computing node to cause the processor to perform a method where a reference file comprising musical notation is read. A plurality of measures and a plurality of notes of the musical notation are determined. A plurality of audio recordings are read where each of the plurality of audio recordings corresponds to at least a portion of the musical notation. For each of the plurality of measures of the musical notation, a corresponding segment of at least one of the plurality of audio recordings is determined. The musical notation is displayed to a user. First selections of a measure of the plurality of measures are received from the user. For each of the first selections, a listing of the plurality of audio recordings in which at least a portion of the selected measure is played is displayed to the user. For each of the first selections, a second selection of an audio recording from the listing is received from the user thereby linking the selected measure to the corresponding segment of the selected audio recording. An audio file is generated by splicing together each of the linked segments.

DETAILED DESCRIPTION

The creation of a musical album, video (e.g., live-action and/or animated), or other media (e.g., with an audio and/or component) often requires recording a musical composition multiple times, in whole and/or in parts. Later, when editing the recordings to create a final production, an engineer, producer, musician, etc. may select the best recording, or "take," for each section (e.g., measure) of the musical composition, such that the best takes can be combined to create the final production. An editor can also divide takes of audio or video into segments, and combine segments of one or more takes in the creation of the final production.

The editing process can be very time consuming, overwhelming, and inefficient. The number of takes often vastly outnumbers the length of the final composition, and each take must be parsed through and compared against the other takes in order to select the best take for each section of the musical composition. For example, a 70-minute audio CD of a musical performance can often require 20 or more hours of takes. Similarly, a 70-minute movie may require many hours of takes.

Editing audio is often done using a digital audio workstation (DAW). With a DAW, finding the best take for a portion of a performance often involves loading all of the audio files (containing the takes) into the DAW, manually locating the time position in each take corresponding to portions of the performance, listening to each recording, taking notes on each recording, and finally, choosing the best recording. Similarly, editing video may be done on a computing device having video editing software and include many of the same steps as audio editing. The process then has to be repeated for each portion of the musical composition represented in the takes. This process can often be tedious, inefficient, and error prone.

Often, an editor must keep all of their thoughts on each take in their memory, or write them down on a separate sheet of paper. This can result in missing the best take and creating a sub-optimal composition. Additionally, finding the starting location of each portion of the performance within an audio recording can be very time consuming, and can often involve opening and closing each individual file, and repeatedly going through the file to find the starting position for a given portion, which can be slow and inefficient. Furthermore, even if an individual take sounds acceptable and is free of errors, it might not sound acceptable when played together with other takes adjacent to the individual take.

Many existing audio and/or video editing applications are not well suited for use by those who are not familiar with their operation. Existing audio and/or video editing applications have a high learning curve and difficult interfaces and, coupled with the challenges outlined above, can make editing a project too daunting and overwhelming for non-professional editors, such as musicians or video/movie producers.

Figure 1:
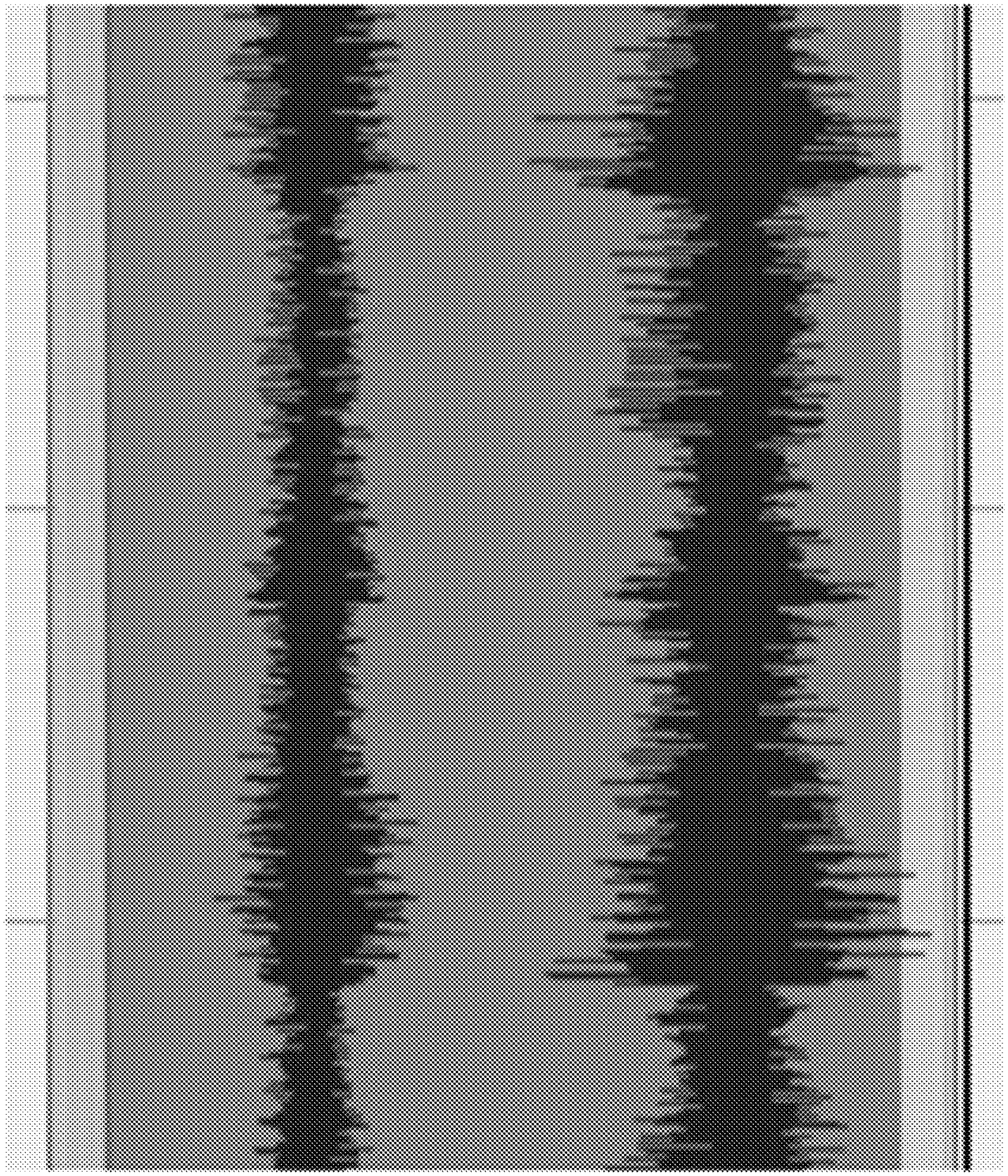
FIG. 1 illustrates a waveform representation of an audio recording.

FIG. 1 shows a waveform representation of an audio recording. In various embodiments, the waveform may represent at least a portion of a musical composition that is played by one or more instruments. In various embodiments, audio-editing systems provide a waveform-based interface for audio editing. Using such interfaces provided by audio-editing systems, in order to find a starting location of a particular portion of the performance within a given recording, a user must parse through the recording and then annotate the position along the waveform where the portion begins. However, there is no efficient way of searching a waveform to determine where a specific measure (or portion of a measure) of the musical composition begins, as a waveform does not intuitively correspond to the contents of the corresponding recording. Additionally, each recording may have a different waveform (e.g., due to noise), making the process all the more challenging when many takes of a musical piece are being analyzed.

To address these and other drawbacks of existing audio-editing systems, the present disclosure provides for audio-editing systems that allow a user to easily select the best recordings and combine them to form a complete production. In various embodiments, a user interface is generated by an application that provides for a score-based view of the musical composition and provides a user with one or more takes of the musical compositions relevant to each portion of the score. The application further allows a user to quickly review, annotate, select, and splice takes corresponding to each portion of the score. Embodiments of the present disclosure allow for faster and more intuitive audio editing, and provide for a user interface that is accessible to non-professionals. In various embodiments, non-professional editors who are intimately familiar with the performance, such as musicians, can take a part in the editing process, resulting in a more optimal final product.

In various embodiments, a reference file is read by a computer and subsequently displayed on a display (e.g., screen of a computing device). In various embodiments, the reference file may comprise notation for a musical composition, such as a music score (for an audio-editing project) or a screenplay of a movie (for a video-editing project). In various embodiments, the reference file may be an abstract visual representation of the original piece (e.g., a full concert or movie). In various embodiments, a plurality of portions (e.g., measures, system breaks, lines, or notes) of the reference file are determined. In various embodiments, a plurality of audio or video recordings (e.g., takes of all or a portion of a performance), are read by the computer. In various embodiments, each of the plurality of audio or video recordings can correspond to at least a portion of the reference file. In various embodiments, a matching is created between each portion of the reference file and at least one segment of the takes in which the portion occurs. In various embodiments, using a user interface, a user can select a portion, and be provided with a list of all takes in which the portion occurs, and the segment within each take in which the portion is played. The user can select a desired segment of a take for each portion. The selected segments can then be spliced together to generate an audio or video file comprising a complete audio or video recording.

In some embodiments, a reference file is read by an application on a computer. A user can point the application to a particular file, which is then read by the application. In some embodiments, the file is a music score and comprises a visual representation of the final audio and/or video product (e.g., musical notation, a screenplay, a musical score, etc.). However, it will be appreciated that other types of files can be read as well, such as screenplays. Thus, where reference is made to a score, it should be understood that other file types are also suitable for use according to the present disclosure. It will be appreciated that the music score can exist in a variety of formats, such as a scanned copy of a physical score, or as digital sheet music. In some embodiments, an audio file is provided to the application, and the score is transcribed automatically from the audio file. The application can display the score to the user.

In some embodiments, the reference file is analyzed by the application. In some embodiments, the reference file is preprocessed prior to analysis. In some embodiments, the reference file is preprocessed to reduce or remove noise (e.g., Gaussian noise) in the audio or video reference file. In embodiments where the reference file is a music score, the score is analyzed to identify various features of the score. In some embodiments, the score is analyzed to identify bar lines, staffs, and system breaks. In some embodiments, measures are identified in the score. In some embodiments, repeated sections are identified in the score. In some embodiments, individual notes are identified. However, it will be appreciated that other musical symbols can also be identified by embodiments of the present disclosure. In some embodiments, a computer vision algorithm, such as optical music recognition (OMR) is used to perform the analysis and identify various symbols in the score.

In various embodiments, optical character recognition (OCR) may be applied to the reference file. In various embodiments, an optical recognition algorithm may detect a top and/or a bottom of a system (i.e., a collection of staves).

In various embodiments, recognition of various features within musical notation can be performed by searching for one or more pattern(s). In various embodiments, the algorithm may search an input file (e.g., a page of musical notation) for a particular shape or shapes. For example, the algorithm may search a file for large rectangles of white pixels (i.e., little to no black pixels) that span the width of the page. In various embodiments, the algorithm may search for bar lines after the white space has been identified. In various embodiments, the algorithm may search for bar lines by searching for a particular shape or shapes. For example, the algorithm may search for long thin vertical lines including dark (e.g., black) pixels. In various embodiments, the shape of the bar lines may extend from a bottom to a top of a system. In various embodiments, the shape of the bar lines may have a predefined proportion to the length and/or width of the page. In various embodiments, by recognizing systems and bar lines, the algorithm may map a scanned page into rectangles (i.e., measures). In various embodiments, the algorithm may ignore the contents (e.g., notes) within the identified rectangles to thereby identify measures.

In various embodiments, where the processes described herein are applied to video, any suitable symbols may be identified in the visual presentation (e.g., a screenplay) of a final production (e.g., a full movie). In various embodiments, for either the audio- or video-editing applications, the symbols may include industry-standard symbols. In various embodiments, the symbols may include user-defined symbols. In various embodiments, the symbols may be alphanumeric symbols. In various embodiments, the symbols may be non-alphanumeric symbols (e.g., objects). In various embodiments, the system may be configured to detect the specific symbols (e.g., alphanumeric, non-alphanumeric, user-defined, etc.) within the reference file.

In embodiments where optical music recognition is used to recognize the score, a new reference file can be produced in a format that is easier for the application to analyze. A variety of formats are suitable for use according to the present disclosure, such as PDF, JPG, PNG, MusicXML, MuseScore, and others. The new reference file can be displayed to the user.

In various embodiments, any of the audio files may be normalized prior to processing. For example, a Hann function may be applied to the audio file to perform Hann smoothing.

In various embodiments, audio transcription may be performed using any suitable method as is known to one skilled in the art. In various embodiments, audio transcription may be performed using, a Fourier transform (e.g., discrete), a fast Fourier transform (e.g., windowed), and/or a spectrogram. In various embodiments, audio transcription may be processed using a cognitive process, such as machine learning or an artificial neural network. In various embodiments, an open source toolkit may be used for audio transcription. For example, Music21 may be used to transcribe audio to sheet music.

In some embodiments, the recognized score is presented to the user. The user can then annotate the score and link takes to portions of the score in which they are played. In some embodiments, the identified bar lines, staffs, system breaks, measures, notes, and/or other symbols are presented to the user for verification. In various embodiments, a collection of staves may be called a system. The user can select any incorrectly identified symbol and input a correct symbol in its place. Alternatively, the user can add symbols or remove identified symbols. For example, in embodiments where bar lines and system breaks are recognized by the application, the identified bar lines and system breaks can be shown to the user overlaid on the original score. The user can then adjust the positions of the bar lines and system breaks, create new bar lines, or delete existing bar lines.

In some embodiments, the application can create an internal representation of the identified measures or other symbols. In some embodiments, the internal representation is a list of measure numbers, together with a corresponding page number and location on the page for each measure.

Figure 2:
FIG. 2 illustrates an exemplary division of notation sheets according to embodiments of the present disclosure.

FIG. 2 shows an exemplary division of notation sheets. In various embodiments, a score 174 is presented to a user. In various embodiments, as shown in FIG. 2, the application has analyzed the score and identified bar lines 176 and system breaks 178, and presents the identified division of the score to the user in the form of a grid. In various embodiments, as shown in FIG. 2, the application divides the score into a plurality of measures. In some embodiments, the identified measures are numbered by the user and/or application. In some embodiments, the user can adjust, remove, or add bar lines or system breaks to the score. In some embodiments, the results of the analysis are stored internally and not displayed to the user. In such embodiments, the user is presented with an unmarked score.

In some embodiments, a graphical user interface (GUI) is provided to the user, whereby the user can link takes and measures in the score. In some embodiments, the GUI displays the score to the user, which can be a more intuitive and easy to use visual representation of the performance than the waveform view often used in DAWs. In some embodiments, the GUI allows for the selection of measures, viewing and playback of takes, selection of takes, and splicing takes to form an audio file. In some embodiments, the GUI also allows for comments and annotations to the score, takes, and/or other comments and annotations. In some embodiments, the GUI also allows for the display of relevant information or metadata relevant to the audio editing process, such as information regarding the performance, the takes, or the score.

In some embodiments, the application can adjust the size of the contents that it displays to the user. In some embodiments, the application is configured to display a predetermined number of staffs to the user. In some embodiments, the user can input how many staffs they would like the application to display in a single window. In some embodiments, the user is able to zoom in on the displayed score. In some embodiments, as the user zooms into the score, the application adjusts the view so that the displayed portion of the score scales in such a way so as to remain visible.

In some embodiments, some scores may be notated with repeat signs, which indicate that a given section of the score is to be repeated. In some embodiments, where two or more recordings exist for the repeated section of the score, an editor may match different recordings to different repetitions of the score. In some embodiments, the application identifies sections of the score that are indicated with repeat signs, and duplicates the repeated section for display to the user. In this way, the user can match different takes to different repetitions of the score, and view each individual repetition and the matched takes on the GUI.

In some embodiments, the application displays the score as pages of sheet music. In some embodiments, the application displays repeated sections of the score by duplicating the portion(s) of the score containing the repeated sections. In some embodiments, in order for non-repeated sections of the score to only be annotated once, the application may disable annotation of the non-repeated sections on all but one page of the duplicated pages. In some embodiments, sections of the score that are not repeated are only annotated once, and sections that are repeated are annotated as many times as they are repeated. In some embodiments, the portion of the score intended to be annotated may be highlighted (e.g., presented in full color), while the portion of the score that is not intended to be annotated may be faded (e.g., grayed out).

Figure 3A:
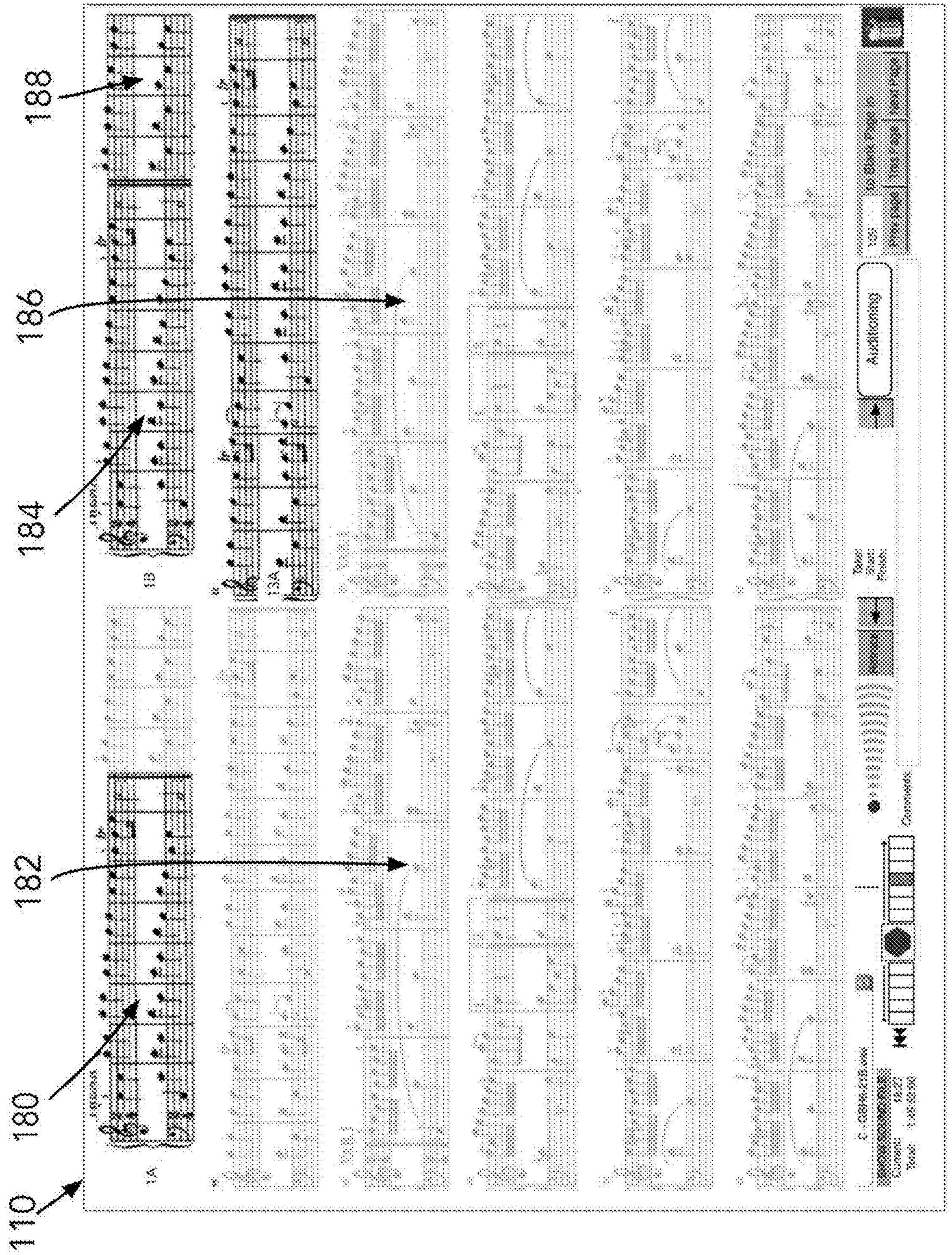
FIGS. 3A-B illustrate an exemplary user interface for audio editing according to embodiments of the present disclosure.
Figure 3B:
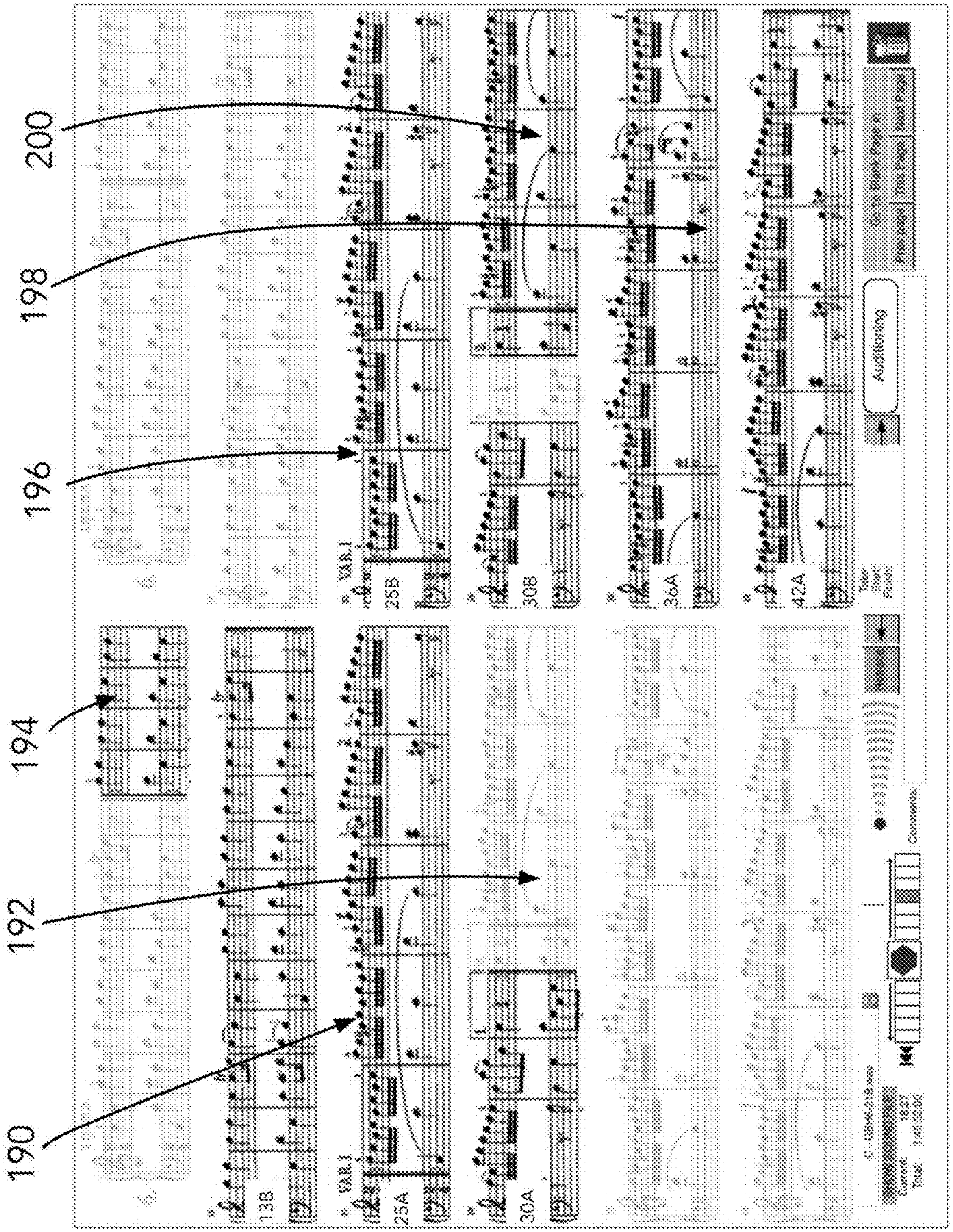

FIGS. 3A-3B show an exemplary user interface for audio editing. In various embodiments, in analyzing score 110, the application identified that score 110 contained repeated sections. FIGS. 3A-3B show four copies of the same sheet of the score, each with a different portion available for annotation. In various embodiments, as the display of FIGS. 3A-3B only shows two sheets at once, the user may navigate between the view of FIG. 3A and FIG. 3B to see all copies of the sheet. In various embodiments, as shown in FIGS. 3A-3B, the portions of the score that are available for analysis are displayed in black, while the portions of the score not available for annotation are disabled and displayed in gray.

FIG. 3A shows first duplicated page 182 and second duplicated page 186 of the score. On first duplicated page 182, only a portion 180 (e.g., measures 1-8) are enabled for annotation. As the subsequent portion of the music is a repetition of the portion 180, the remainder of page 182 is disabled, and second duplicated page 186 displays repeated portion 184. Additionally, a subsequent portion of the music, portion 188 (including measures 9-24), are enabled for annotation as well. However, as portion 188 are to be repeated, the rest of second duplicated page 186 is disabled. FIG. 3B shows a third duplicated page 192 and a fourth duplicated page 198. The third duplicated page 192 displays repeated portion 194 (including measures 9-24), and portion 190 (including measures 25-32) as enabled for annotation. Fourth duplicated page 198 displays portion 196 (including measures 25-31) as enabled, but disabled annotation of measure 32, as it is only played once. Measures 32-48 200, which have not been enabled yet, are enabled on this page as well.

In some embodiments, the application reads a plurality of audio files. In some embodiments, the audio files are audio recordings of the music represented by the score. In some embodiments, the user points the application to a file or folder containing the audio files to be read. In some embodiments, the audio files comprise all of the available takes of a composition or a recording session. In some embodiments, at least one take includes the entire musical composition from start to finish among the audio files. In some embodiments, multiple takes can be combined to create a recording of the entire musical composition. In some embodiments, the user can indicate to the application which take (or takes) are to be included in the musical composition. In some embodiments, the audio files are preprocessed by the application to remove noise (e.g., Gaussian noise) in the audio or video file.

In some embodiments, matching is performed between the various takes and the measures of the score to thereby determine which of the measures of the score are represented by each take. In some embodiments, the matching is done automatically by the application. In some embodiments, the application analyzes the audio in each take, and determine one or more portions of the score corresponding to each segment of audio in the takes. In some embodiments, the application maintains a list of each measure and identifies the takes in which that measure is played. In some embodiments, the application can keep a list of each take, and the measures that are played in the take.

In some embodiments, the results of the matching are stored in a database, whereby each measure is linked with all takes where the measure is played, and for each measure, a timestamp of where in the take the measure begins and ends is stored. Thus, the application can receive a selection of a measure from a user, and provide a view of all takes in which the measure is played, along with the location in each take at which the measure begins. In some embodiments, the takes can be made available for playback to the user. In some embodiments, when a measure is selected, playback begins at the segment in which the selected measure is played. The application can also receive a selection of a take from a user, and provide a view of all measures that are played in the take. In some embodiments, the portion of the score containing those measures can be highlighted when the take is selected.

It will be appreciated that a variety of methods can be used to automatically match takes with the measures played in the takes. For example, the application can generate a sample recording for each measure based on the notes identified in that measure. The application can then parse through the audio files, matching the audio in each file with sequential sample recordings. When the application finds an audio file similar to a set of sequential sample recordings, the application matches the audio file with the measures played by the sequential sample recordings. In another example, the application can translate each audio recording into individual notes, and match the notes played in each recording with a set of measures in the score. When the application finds a set of measures similar to the transcribed notes, the application creates a matching between the set of measures and the transcribed audio recording. The matching can also comprise a matching of each individual measure with the segments of the takes in which the measure is played.

In some embodiments, the matching is done manually by a user. In some embodiments, the user plays each recording, and identifies a starting point on the score where the music in the recording begins. At the start of each measure in the recording, the user can indicate to the application that the new measure has begun. In some embodiments, the user can press a key on a computer keyboard, such as the "d" key, to indicate the start of a measure in the recording. By indicating the start of a measure, the application creates a mapping between the measure in the score and the position in the audio recording where the start of the measure was indicated. The segments of the audio recordings between the start of one measure and the beginning of the next measure can then be linked to the measure in the score that is being played. In this way, a mapping can be created between each measure and the segments of the audio files in which the measure is played.

In some embodiments, once the starting point is identified, the application provides an indication to the user of which measure is to be identified next. For example, the application can highlight the bar line indicating the start of the next measure, or it can display an arrow which points to the next measure. Upon the user indicating the start of the measure in the audio recording, the application indicates the next measure to be identified, and so on.

In some embodiments, an undo feature is provided, whereby the user can undo various annotations made to the score and/or recordings. For example, if a user were to indicate the start of a measure in an incorrect location in the recording, the user can press an undo button, or a combination of keys used as a shortcut for the undo button, and the indication that the user just made will be removed. In some embodiments, the playback of the recording rewinds for a period of time (e.g., 5 seconds), in the event that the correct location for the measure start had already been played while the user undid their actions. In some embodiments, the audio playback can be slowed down for more accurate identification of measure starts.

In some embodiments, the matching is done semi-automatically, whereby the user manually indicates the start of each measure of the score in at least one audio recording, and the application then analyzes the indicated measures and the remaining audio recordings to map each of the remaining audio recordings to a set of measures in the score. For example, the user may play a single recording of the entire performance, and indicate the starting timestamp of each measure. By having an indication of the start and end of each measure, the application is provided with a recording of each measure. The application can then search through the remaining recordings and determine which measures are being played by comparing the recordings to the manually indicated recordings of each measure.

In various embodiments, comparison of segments of an audio and/or video file may be performed using a cognitive process, such as machine learning. In various embodiments, comparison of segments of an audio and/or video file may be performed using a neural network. In various embodiments, comparison of segments of an audio and/or video file may be performed using spectrogram data. In various embodiments, comparison of segments of an audio and/or video file may be performed by applying a Fourier transform to thereby transform a signal from a temporal domain into a spectral (frequency) domain. In various embodiments, a spectral representation of a signal (e.g., a take) may be compared to known spectral representation of a signal (e.g., a portion of a performance) to determine a similarity metric. In various embodiments, the spectral representation of the signal (e.g., the take) may be compared to one or more (e.g., all) portions of a performance to determine a similarity metric for each comparison. In various embodiments, a maximum similarity may be selected from the plurality of similarity metrics. In various embodiments, after a maximum similarity metric is determined, the respective portion of the performance may be linked to the take associated with the maximum similarity.

In some embodiments, measures that are redundant (e.g., from a repeated section) can be identified, and the takes for one measure can be linked to identical measures as well. In this way, a user can access all takes of a given measure of the score, even if the take was not created for that iteration of the measure per se. The identification of identical measures can be done manually by the user, or automatically, such as by creating an index of notes in each measure and searching the index for duplicates for every new measure read.

In some embodiments, when the measures and segments of takes are linked, a user can play all of the takes for each measure, and select a take for use in the final production.

Figure 4:
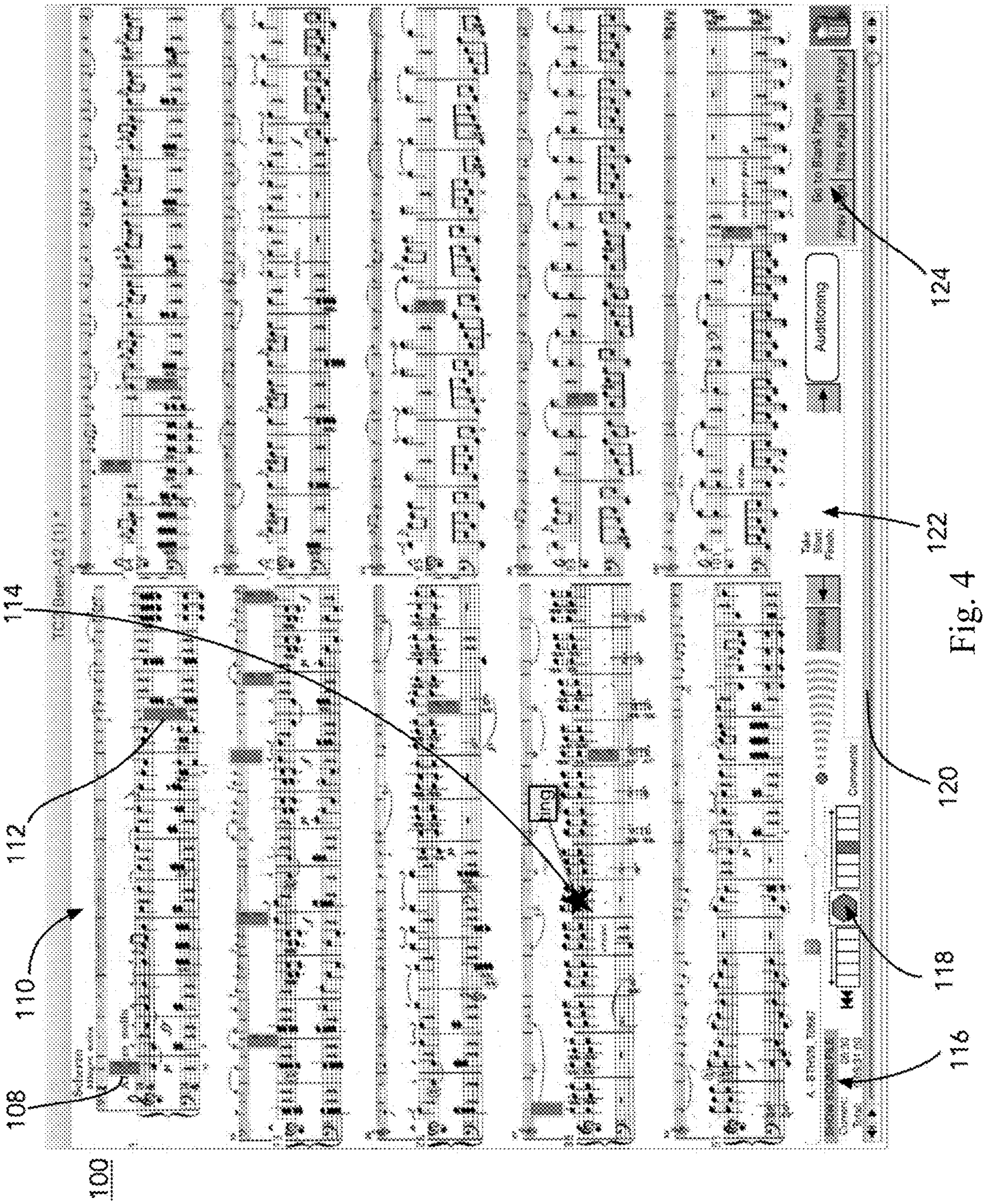
FIG. 4 illustrates an exemplary user interface for audio editing according to embodiments of the present disclosure.

FIG. 4 shows an exemplary user interface for audio-editing. In some embodiments, a score 110 is displayed to a user. In the view shown in FIG. 4, two consecutive sheets of the score are shown side by side. Indicators 108 (e.g., rectangles) show that a take has been selected for the score beginning at the location of the rectangle and continuing until the location of the next rectangle. For example, one take has been selected to represent the score from the first indicator 108 at measure 1 to the second indicator 112 at the end of measure 9. In some embodiments, annotations 114 can be made by a user on a portion of the score, a particular take, or comments. In various embodiments, annotations may include one or more shapes (e.g., star, circle, square, and/or triangle). In various embodiments, annotations may include text. In various embodiments, the user interface 100 may also include one or more controls to aid a user in navigating or using the system. In some embodiments, the user interface of FIG. 4 includes control 116, which can be used to display an audio file and/or information about an audio file. For example, when a measure is selected that already has a take selected for it, the control 116 can be used to display information about the selected take. In some embodiments, control 118 can be used to play and navigate through an audio file, and/or to adjust playback settings, such as the playback speed. In some embodiments, control 120 can be used to navigate through or play an audio file, a segment of an audio file, or the entire edited performance. In some embodiments, control 122 can be used to navigate between takes, such as between available takes for a given measure, or between selected takes for sequential portions of the score. In some embodiments, control 124 can be used to navigate between pages of the score. For example, a user can input a page number and be directed to the desired page, or a button can be pressed to direct the user to portions of the score for which takes have not been selected.

In some embodiments, when a user clicks or hovers over indicator 112, the portions of score 110 played by the take indicated by rectangle 112 are highlighted. In some embodiments, when a user hovers over or clicks on indicator 112, the application allows the user to play that take starting at the particular measure. In some embodiments, the application provides the user with (e.g., displays) information about the take, such as the name of the take and/or comments that were made on the take.

Figure 5:
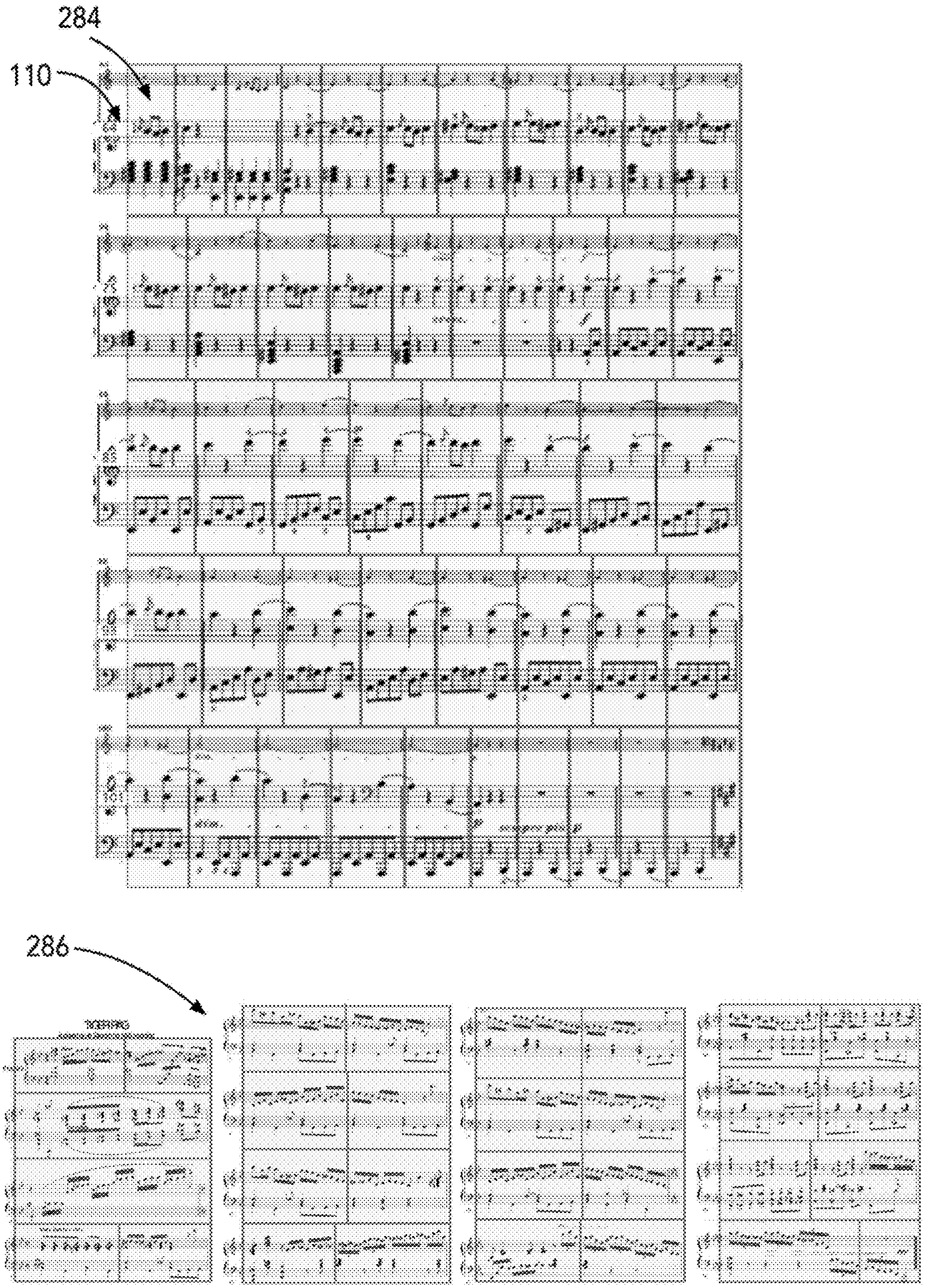
FIG. 5 illustrates exemplary pages of a score where each score is divided into measures according to embodiments of the present disclosure.

FIG. 5 shows exemplary pages of a score where each score is divided into measures. Score 110 is divided into a plurality of divisions 284. In some embodiments, each division 284 forms a boundary around a measure of the score. For example, each division may include a starting bar line as a left border, an ending bar line as a right border, and the top and bottom borders may be defined by system breaks. In some embodiments, divisions 284 can each be outlined for easy visual identification. The division of score 110 can be made visible to a user. In some embodiments, the division of score 110 may be hidden from view, for example, by toggling a button in the GUI. Pages 286 of the score can similarly be divided into divisions 284. In some embodiments, pages 286 may be displayed as thumbnails to a user, and/or can be displayed as resembling a stack of cards. In some embodiments, a user can navigate to a page by clicking on its thumbnail.

Figure 6:
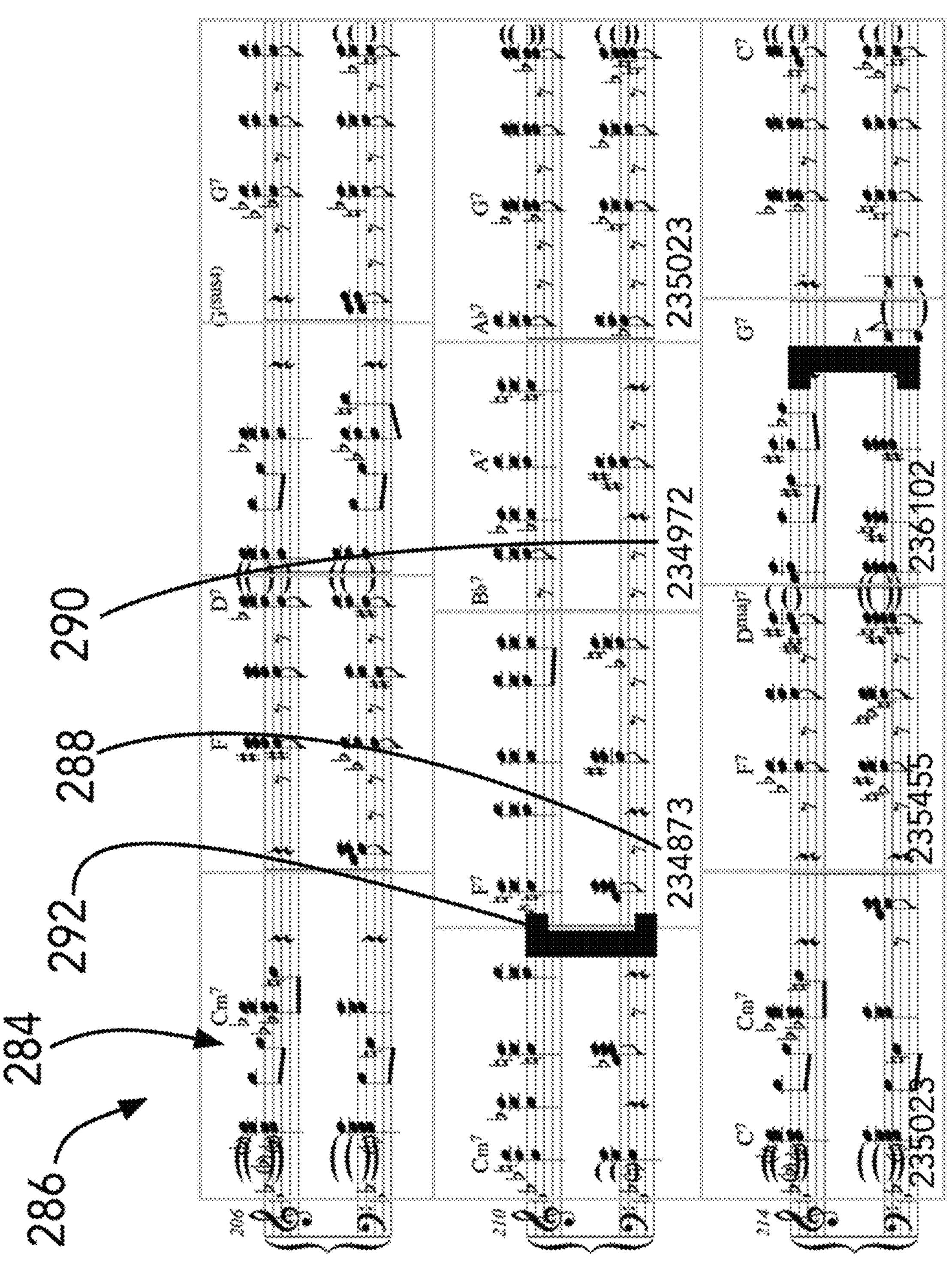
FIG. 6 illustrates an exemplary mapping of a take to a page in a score that has been divided into measures according to embodiments of the present disclosure.

FIG. 6 shows an exemplary mapping of a take to a page in a score that has been divided into measures. In some embodiments, a page 286 is created for each take. The page 286 may contain all measures played in the take. The page may include brackets 292 to indicate the start and end of the portion of the score recorded in the take. In some embodiments, each measure may be bordered by a division 284. In some embodiments, for one or more measures, a timestamp corresponding to the start of the measure in the take may be displayed within the division 284. For example, timestamp 288 indicates the start of the first measure played in the take, and timestamp 290 indicates the start of the second measure played in the take.

Figure 7:
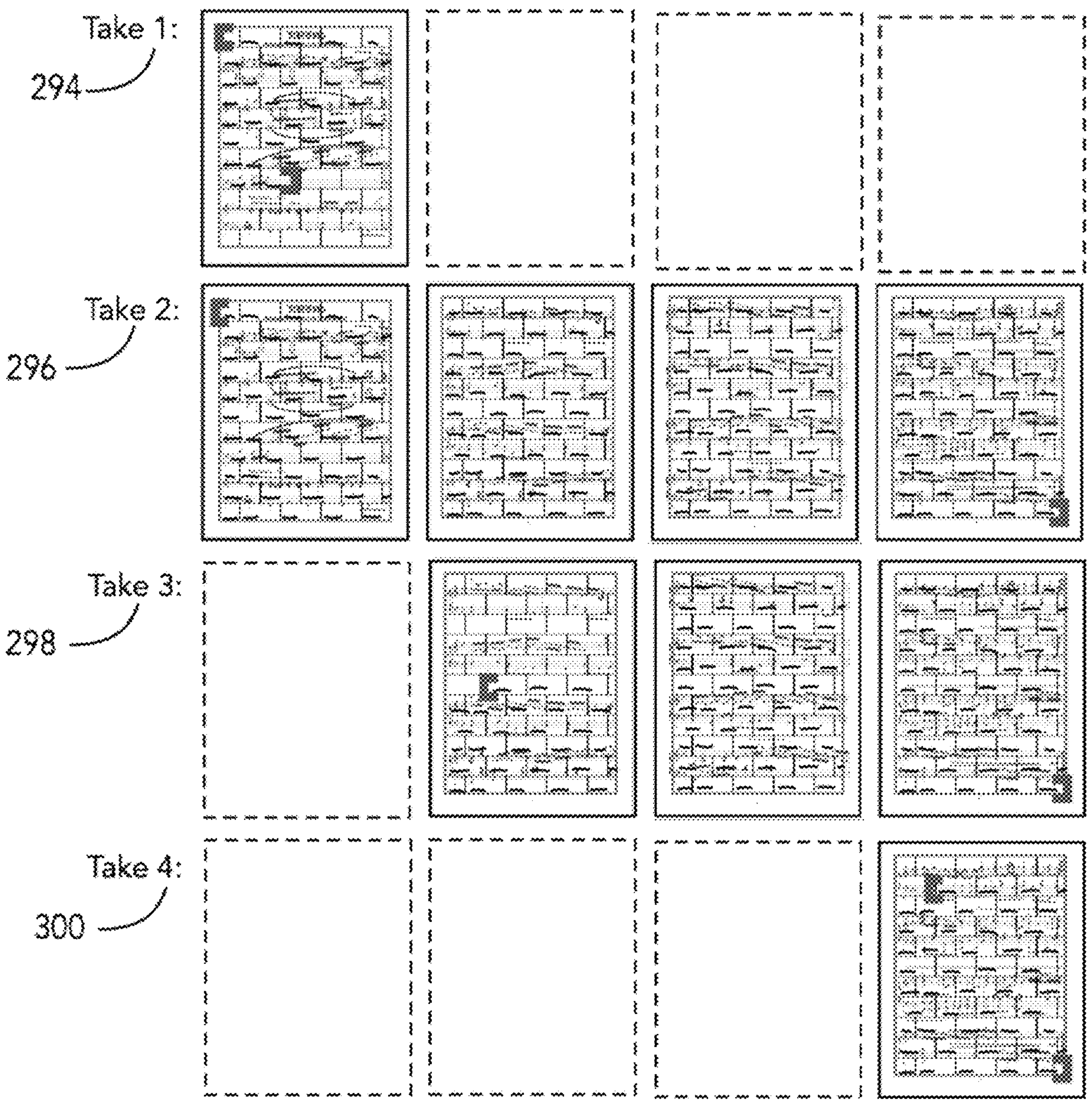
FIG. 7 illustrates an exemplary display of multiple takes according to embodiments of the present disclosure.

FIG. 7 shows an exemplary display of multiple takes. In some embodiments, for each take, the pages of the score spanned by the take are shown. In particular, FIG. 7 depicts an exemplary score (written on a total of four sheets) of a musical composition, and four takes recording various portions of the score. A first take 294 covers only a portion of the first page of the score, hence only the first page is displayed, and only the played measures are notated. A second take 296 covers the entire musical composition, so all four pages are shown and notated. A third take 298 covers a portion of the second page of the score, and the entirety of the third and fourth pages. A fourth take 300 covers only a portion of the fourth page of the score.

In some embodiments, the pages are stored in a database by the application. In some embodiments, the pages are generated at runtime, upon selection of a given take by the user. In various embodiments, takes and measures can be displayed in alternative ways, such as with a list, chart, or table.

In some embodiments, when a user selects a measure, the application displays all available takes in which the measure is played. The user can play a take to listen to it. In some embodiments, the takes automatically play one after another. In some embodiments, the user can select a subset of the takes to automatically play one after another, reducing the number of takes that the user must listen to. This can allow for a smoother user experience, as the user does not have to manually play each take. The user can then select a take that they wish to use for the final audio file. The takes can be displayed in various ways, such as a table, list, or as a visual representation. FIG. 6 and FIG. 7 depict an exemplary visual representation of takes. In some embodiments, the application can provide the user with a list of all measures, what takes they are played in, at what position in the take they are played in, whether or not the takes have been reviewed by a user, whether the takes and/or measures are commented on, whether a take has been selected for a measure, and/or any comments or errors that are noted on the measures and/or takes. In some embodiments, the available takes for a given measure can be displayed with details of the takes, such as the file name, the take number, the time at which the measure is played, and a timestamp of when the take was recorded. Additionally, the application can indicate whether a take that has been selected for the final product was originally recorded for that measure, or whether it was recorded for an identical measure elsewhere in the score.

In some embodiments, the application allows the user to review and annotate the available takes and segments for a selected measure. In some embodiments, the user can give each segment a rating for the selected measure. The rating can be in a variety of forms, such as a number from 1 through 10, a number of stars, an emoticon displaying a user's reaction to the segment, or a binary indicator as to whether the segment is good or bad. In some embodiments, the username of the user making the ranking can be saved by the application. In some embodiments, the username of the person making the ranking can be viewed by hovering over or clicking on the ranking. In some embodiments, ratings can be assigned a color corresponding to the user who made the ranking. In some embodiments, a particular color (e.g., black) or annotation format can indicate that the ranking was made by a project administrator or creator.

In some embodiments, the application allows for comments to be made. Comments can be made on various elements of the application, such as a particular take, a segment of a take, a particular measure, a ranking of a segment, or other comments. In some embodiments, comments can be made by any collaborator and can be responded to by any collaborator. It will be appreciated that many types of comments can be supported by embodiments of the present disclosure. In some embodiments, the comments comprise textual notes. In some embodiments, a user can predefine certain categories or tags, such as phrases indicating the tone, speed, or sound quality of a segment, and quickly annotate a take by selecting a tag from a drop down menu or by using a keyboard shortcut. For example, the user can predefine the tags "sharp," "flat," "fast," "slow," "good," and "error." When the user clicks on the segment of a take playing a particular measure, the user can select one or more appropriate tags to apply to the take. The tags can also be indexed, so that a user can select a tag and quickly view all segments annotated with the tag.

In some embodiments, the application stores each comment in a database, along with the date and time that the comment was made, the element (e.g., the segment or comment) that the comment is in response to, and the user who made the comment.

In some embodiments, comments and/or rankings can be inputted by keyboard shortcuts. The keyboard shortcuts can be user defined or they can be set to default values in the application. In some embodiments, a comment or ranking made while a particular segment is being played will be linked to that segment. In some embodiments, when a user hovers over and/or clicks on a particular element in the GUI, such as a segment or measure, and makes a comment, the comment may be automatically linked to the particular element in the GUI.

In some embodiments, a user can rank the available segments in which a particular measure is played. In some embodiments, the user can sort the segments by their ranking, allowing the user to easily view and compare the highest ranked segments together. However, it will be appreciated that the segments can be sorted by other features as well, such as their creation date or similarity to the segments selected for adjacent or nearby measures, which can reduce the need for complicated crossfades between adjacent segments. Sometimes, a user may wish to indicate that a particular take should definitely not be used. Thus, in some embodiments, the application allows a user to disable a given take or segment, and can provide a visual indication that the take or segment is disabled. For example, when presenting the user with a list of available segments, the application can display disabled segments as grayed out or with a strikethrough. In some embodiments, when a segment is disabled, it will not play when the application plays all available segments to a user. Thus, a user can listen to only the segments that they are interested in potentially using for the final audio file.

When the entire performance is being played, the application can provide an indication to the user as to which measure is being played at any given moment. For example, a moving marker can be displayed that moves along the score as it is played. At any point, the user can pause the performance, and view a list of the available takes for the measure indicated by the marker. The user can also select a different take to be used for the measure. The user can also move the marker to a desired portion of the score, and the playback can resume from the new location of the marker.

Figure 8:
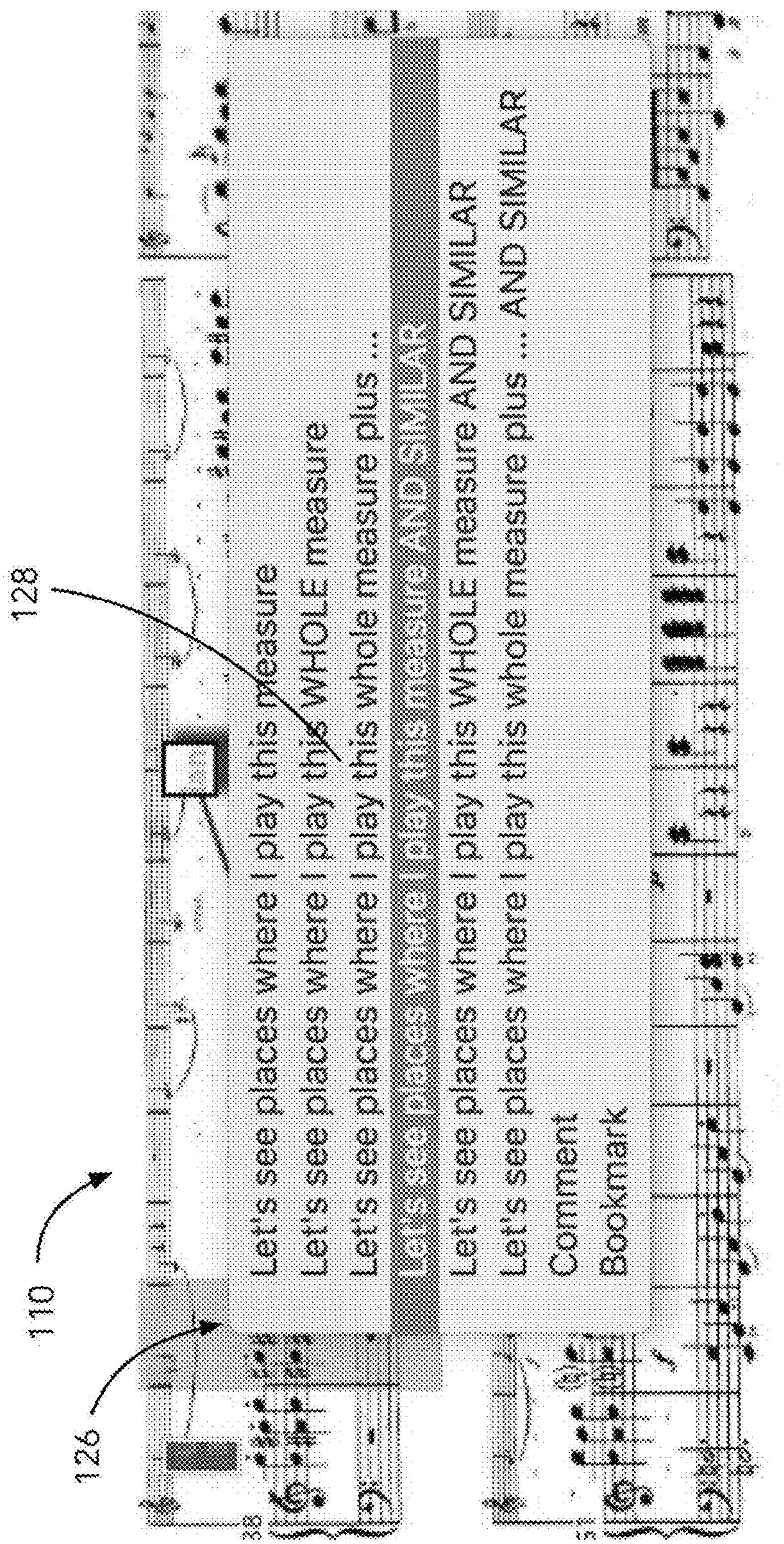
FIG. 8 illustrates an exemplary popup menu for finding places in recorded takes where a given measure was played according to embodiments of the present disclosure.

FIG. 8 shows an exemplary popup menu 128 for finding places in recorded takes where a given measure was played. In some embodiments, menu 128 can be displayed by the application when a user clicks on a measure, such as measure 126 on score 110. In some embodiments, the user can select which recordings they would like the application to display. For example, the application can display all recordings of the selected section of a measure, all recordings of the entire measure, or all recordings of both the measure together and a number of adjacent measures before and/or after the selected measure. In some embodiments, the application can provide the option to include recordings of similar measures elsewhere in the score. In the illustration of FIG. 8, the user has selected "Let's see placed where I play this measure AND SIMILAR," and in response, the application can provide the user with the recordings of the selected measure, as well as recordings of similar measures elsewhere in the score.

In some embodiments, the similar measure(s) may not be exactly the same as the selected measure. In some embodiments, the similar measure(s) may have a degree of similarity to the selected measure. In some embodiments, the degree of similarity may be predefined (e.g., 75%) and the application may only return measures that have a degree of similarity that is above the predefined value. In some embodiments, the application may return a list of measures displaying the degree of similarity associated with each returned measure. In some embodiments, the user can manually indicate multiple measures as similar (e.g., by clicking on two or more measures). In various embodiments, the manual indication may over-ride the computer's determination. For example, the user may choose to indicate that two dissimilar measures are similar if both measures have a single note or sonority in common and the user knows that it will be difficult to find a good take of that note or sonority.

Figure 9:
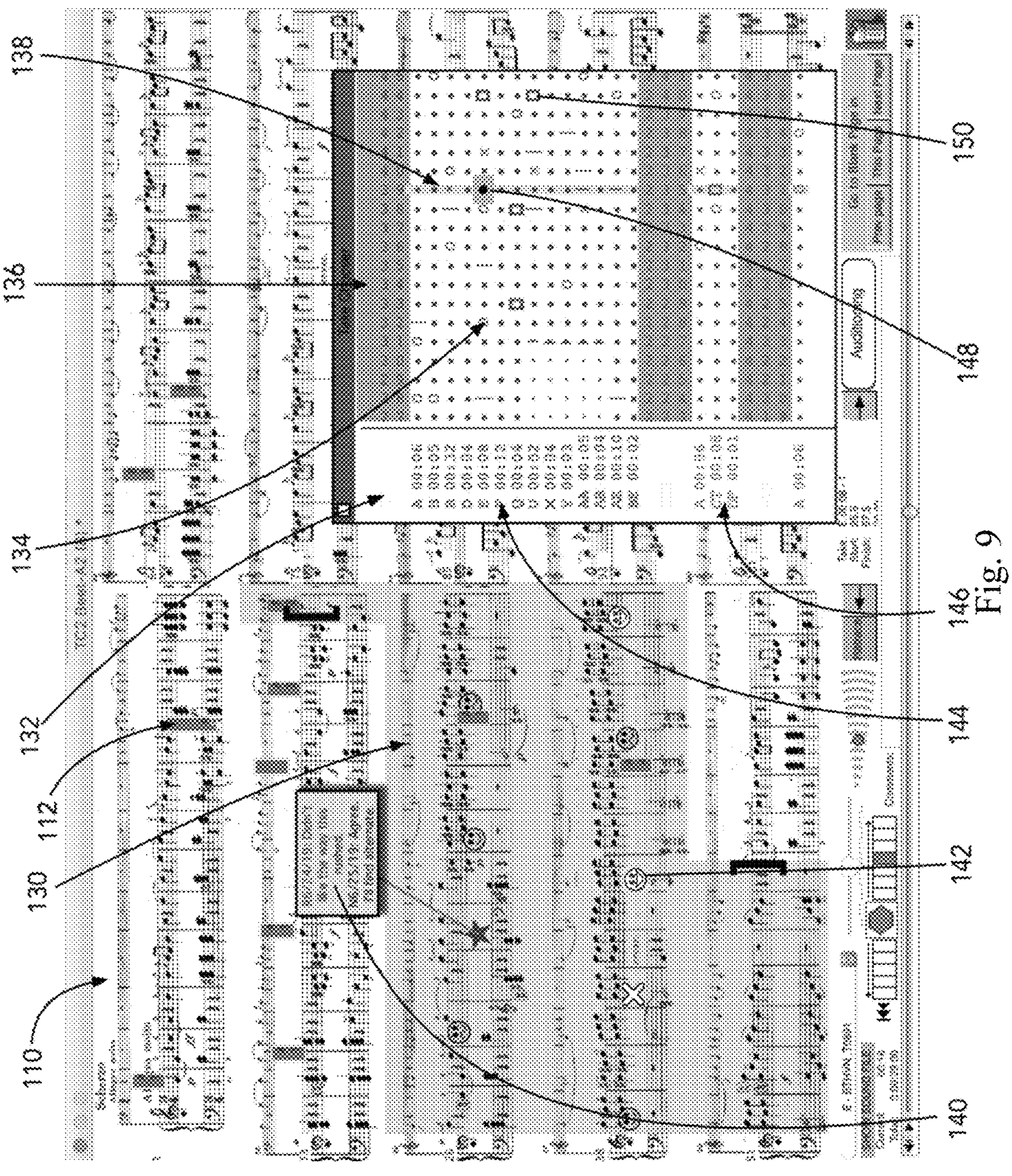
FIG. 9 illustrates an exemplary user interface for audio editing according to embodiments of the present disclosure.

FIG. 9 shows an exemplary user interface for audio editing. The user interface shown in FIG. 9 can be presented to a user in a variety of ways, such as in response to a selection made from menu 128 of FIG. 8. In some embodiments, a chart 132 may display the available takes (e.g., A, B, D, E, F, Q, U, X, Y, AA, AB, AE, BE, CT, DF) to the user. In some embodiments, take names 144, representing the rows of chart 132, are displayed on the left hand column of chart 132. Measure numbers 136, defining the columns of chart 132, are displayed on the top row. In some embodiments, the measure numbers may correspond to a selected measure and a predetermined number of measures before and/or after the selected measure. In some embodiments, the number of measures shown can be a fixed amount. In some embodiments, the number of measures may vary based on a user selection or the size of the display window for chart 132. In some embodiments, the selected measure may be in the middle of measure numbers 138, and an equal number of measures are displayed before (to the left) and after (to the right). In some embodiments, as shown in FIG. 9, the take names 144 for recordings of the selected measure are listed separately from take names 146 for linked recordings of similar measures.

In some embodiments, chart 132 may include a grid 134, which can display information for each take name/measure number combination, and/or it can comprise buttons for each take name/measure number that, when clicked, reveal more information and annotation options. In some embodiments, each take/measure pair is marked with a symbol indicating whether or not it was played, and/or a short-form ranking of the take for the measure. In the exemplary embodiment of FIG. 9, a larger, filled in circle for a take/measure pair indicates that the measure was played in the take, a semicircle with a vertical line indicates that a part of the measure was played in the take (e.g., the take started or ended on that measure), and a small circle indicates that the measure was not played in the take. In this way, a user can easily view the available takes and which measures they include.

Additionally, in some embodiments, the application allows for annotations on a take/measure pair to be displayed on grid 134. In some embodiments, various shapes can indicate a quality level of the take for a given measure. For example, a square can indicate that the take is excellent, an open circle can indicate that it is very good, a vertical line can indicate that the take has a minor error, an "x" can indicate that the take is bad, and an asterisk can indicate that there is noise or other errors in the take. However, it will be appreciated that in other embodiments, different symbols can be used, such as a numerical ranking or a color-coded circle (e.g., red, yellow, green corresponding to a bad, mediocre, and good take, respectively).

As shown in FIG. 9, measure 39 is selected. In some embodiments, when a measure is selected, the corresponding column of take/measure pairs is highlighted. In some embodiments, when a take is selected, the corresponding row of take/measure pairs may be highlighted. In some embodiments, when a take/measure pair is selected in the grid 134, the corresponding row of takes and corresponding column of measures may be highlighted. In some embodiments, the measure may also be highlighted on score 110. In some embodiments, this highlighting can provide a visual aid to a user, preventing the user from accidentally annotating the wrong take/measure pair. In FIG. 9, measure 39 is selected, and highlight 138 is displayed on all of the individual takes of measure 39. Segment 148 of a take titled "E 00:08" has been selected for measure 39, and is highlighted as well. In some embodiments, selection of a take/measure pair can cause the application to display information regarding the take. In some embodiments, the portion 130 of score 110 that is played by the take is highlighted. In some embodiments, the measure played in the selected take/measure pair is highlighted. For example, the entire portion 130 can be highlighted in one color, and the particular measure can be highlighted in a darker shade of the color, or it can be surrounded by a border.

In some embodiments, when a take and/or measure are selected, the application displays comments and other annotations that were made on the take and/or measure. It will be appreciated that the comments and annotations can be in a variety of formats, such as those described above. FIG. 9 also shows an exemplary comment thread 140 made on a segment of the selected take. Comment thread 140 comprises two comments, each labeled with a username of the commenter and a timestamp. In some embodiments, comment threads are visible by default, while in other embodiments, the presence of a comment is indicated by an icon, and the comment is only displayed when the icon is clicked. In some embodiments, the visibility of comments can be toggled on and off by a user.

In some embodiments, symbolic annotations can be made by a user. FIG. 9 also illustrates an exemplary symbolic annotation 142 made on a segment of the selected take. Annotation 142 takes the form of an emoticon indicating a user's reaction to that portion of the take. In some embodiments, the color of the symbolic annotation, or the color of a bounding box around the symbolic annotation, can be used to identify the user who made the comments. For example, annotation 142 has a square background, which can be displayed in a color unique to the user who made the annotation. In some embodiments, annotations made by the creator or administrator of the project are displayed with no bounding box or unique color. When a symbolic annotation is made on score 110 or on chart 132, a corresponding annotation can be made on chart 132 or score 110, respectively, ensuring consistency among the various views of the score and takes. For example, when symbolic annotation 142 is placed on a segment of a take for a particular measure, a corresponding square 150 was created in the corresponding take/measure pair in chart 132.

Figure 10:
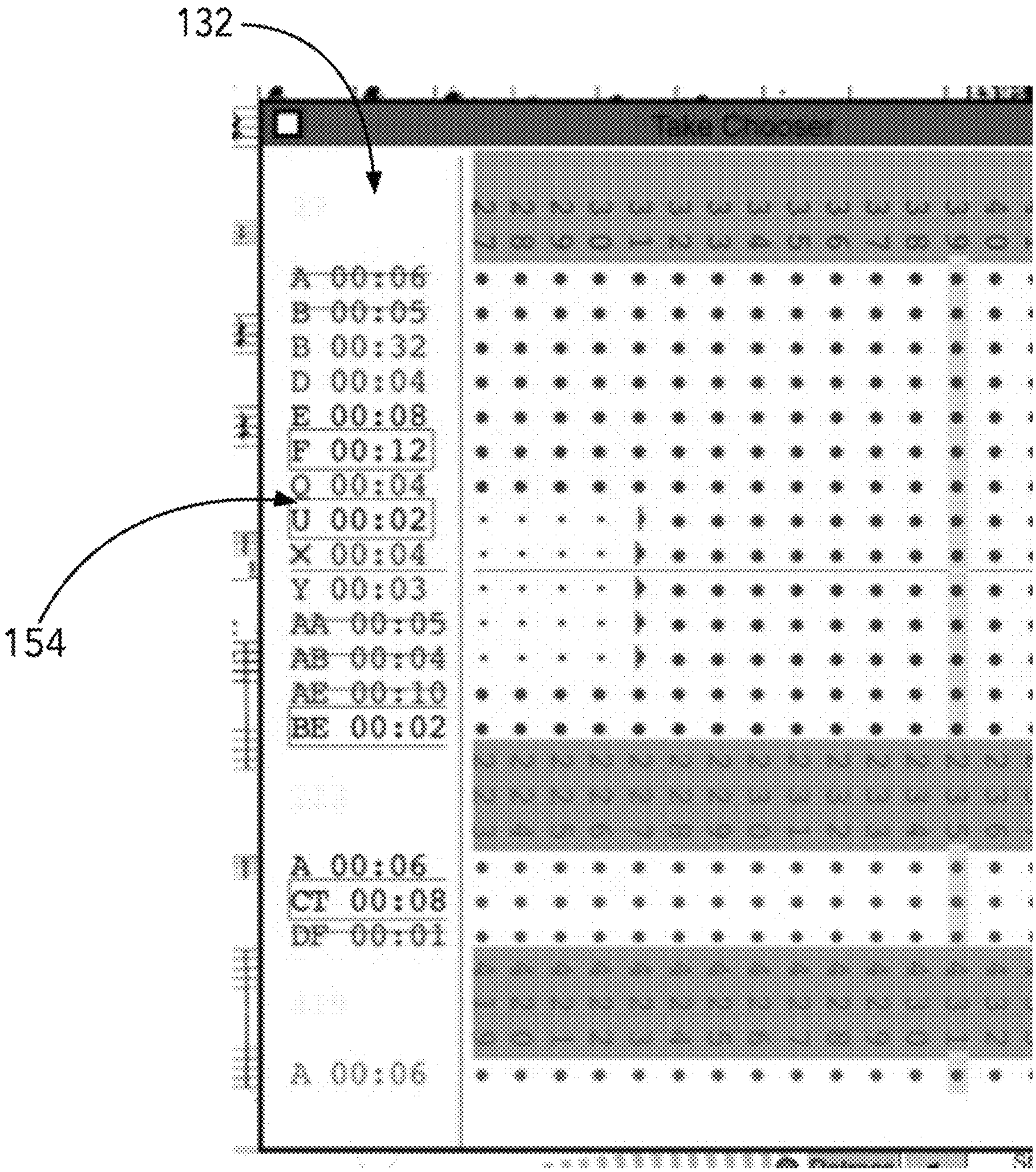
FIG. 10 illustrates an exemplary user interface for audio editing according to embodiments of the present disclosure.

FIG. 10 shows an exemplary user interface for audio editing. In particular, FIG. 10 illustrates a closer view of chart 132 depicted in FIG. 9. Various possible annotations on take names 154 are shown. For example, an outline around a take title in a dark font can indicate that it is "excellent," while a take title in a dark font but with no outline can indicate that it is "good." A take title in a lighter font can be considered "average" or "unranked," while a crossed-out take title can be considered "bad." The annotations can be applied by a variety of methods as described above, such as via a drop down menu or keyboard shortcuts. A user can then choose to listen only to takes that are annotated with a specific annotation, thus saving time and more efficiently selecting a desired take.

Figure 11:
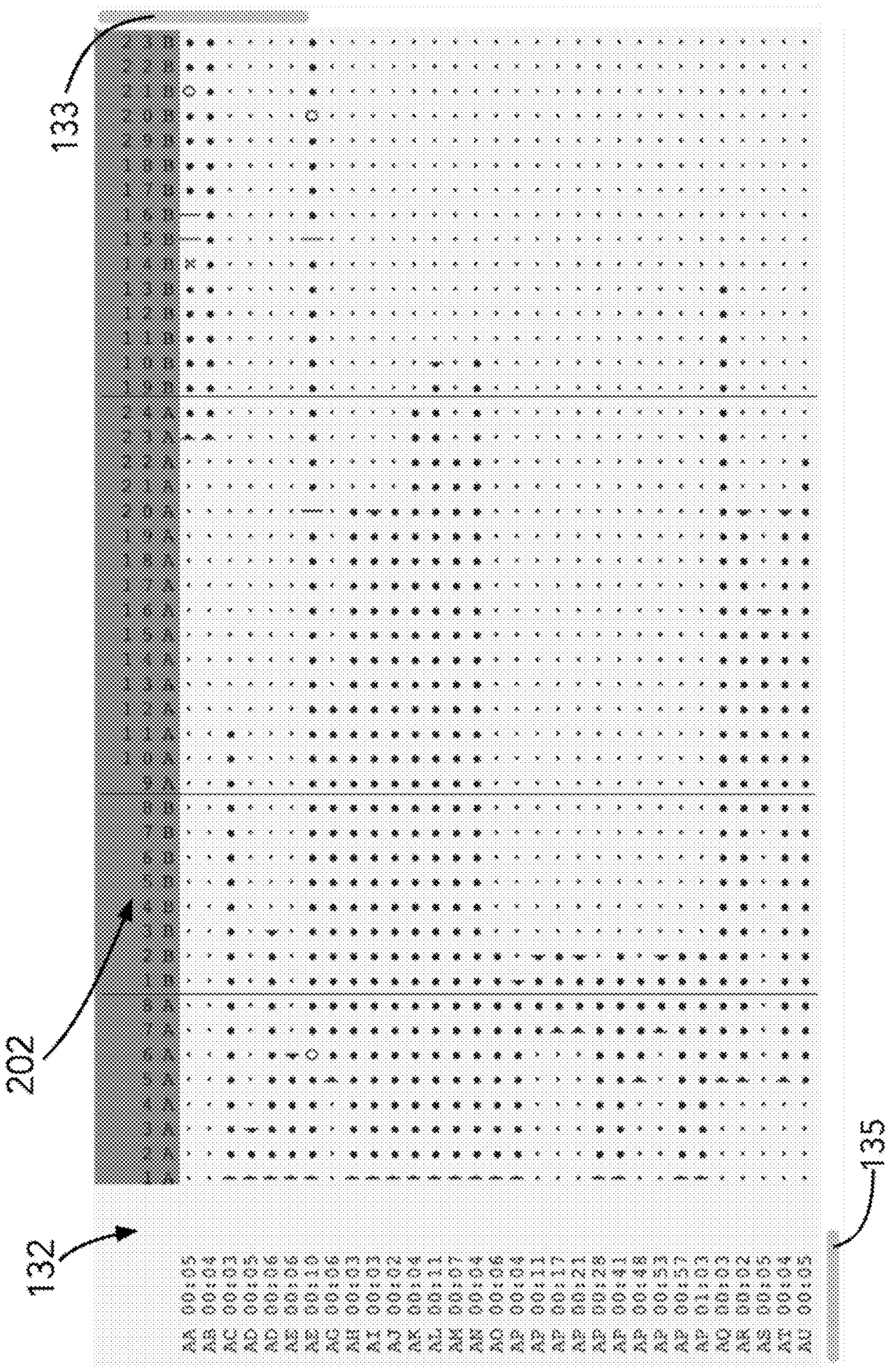
FIG. 11 illustrates an exemplary user interface for viewing takes according to embodiments of the present disclosure.

FIG. 11 shows an exemplary user interface for viewing takes. In some embodiments, chart 132 is a comprehensive display of all takes for a given composition. In various embodiments, the comprehensive display shown in FIG. 11 differs from chart 132 of FIG. 9 in that chart 132 of FIG. 9 only displays takes that contain a specific measure. Scrollbars 133 and 135 allow the user to scroll to other measures and to other takes. The takes and measures shown in FIG. 11 can correspond to the score shown in FIG. 3. In embodiments where the score comprises repeated portions, measure numbers 202 include a measure number for every repetition of a portion. In some embodiments, a letter is appended to a measure number to indicate which repetition it is from. In the example of FIG. 11, the first 8 measures are repeated. Thus, the first repetition is labeled "1A," "2A," . . . "8A," and the second repetition is labeled "1B," "2B," . . . "8B," where "A" and "B" indicate that the measure number is part of the first and second repetitions, respectively.

Figure 12:
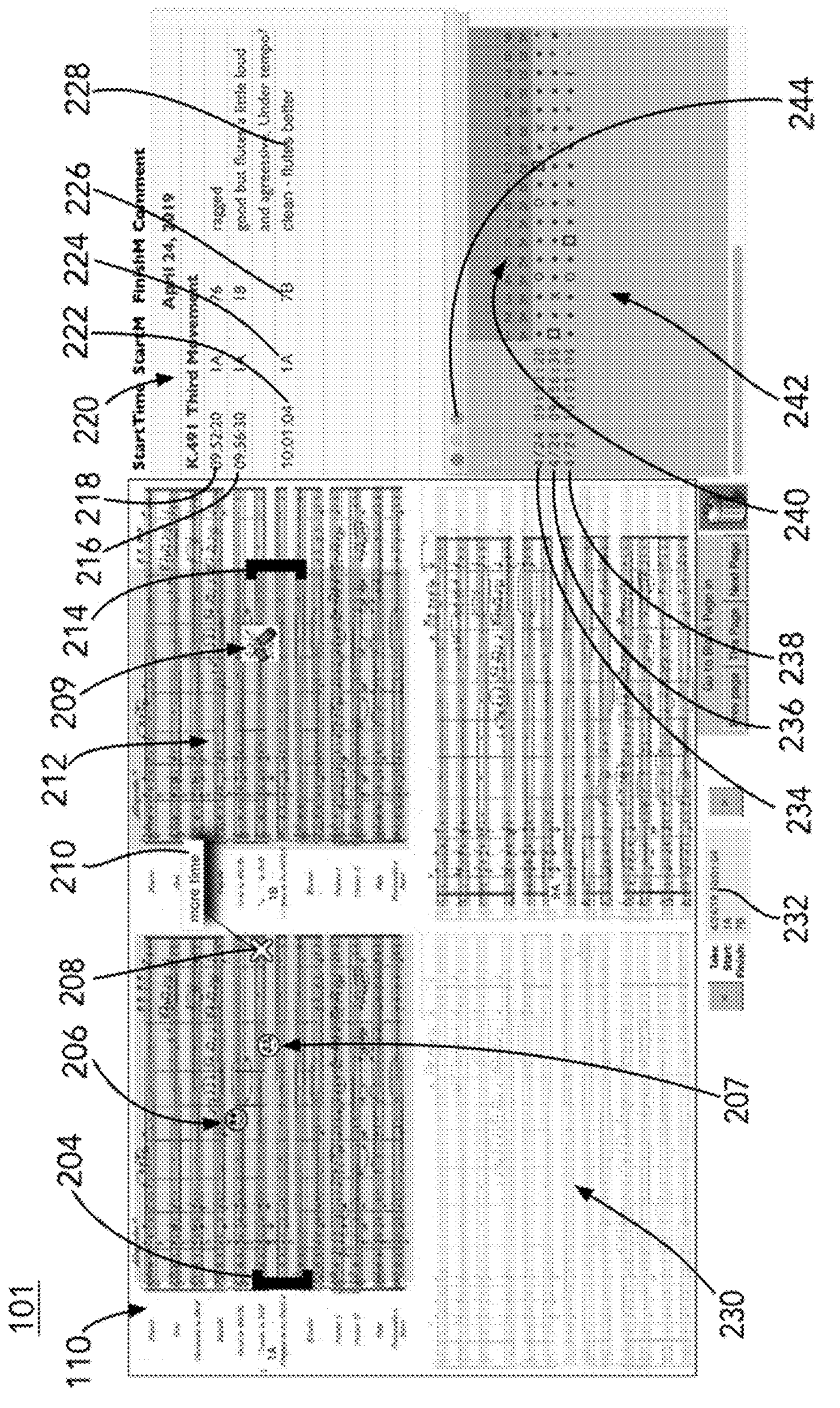
FIG. 12 illustrates an exemplary user interface for audio editing according to embodiments of the present disclosure.

FIG. 12 shows an exemplary user interface for audio editing. The interface shown in FIG. 12 can be useful in a variety of situations to annotate takes in real time, such as when a producer is recording the audio during a recording session. User interface 101 comprises three windows: score 110, notepad 220, and chart 242. In the example of FIG. 12, a composition with repeated sections is being recorded. Thus, section 230 of the score is disabled for the reasons discussed above regarding FIG. 3, and measure names 240 in chart 242 are appended with a letter indicating which repetition they are from, as discussed above with regard to FIG. 11. Three takes were played, and they are indicated on both notepad 220 and chart 242 with titles 218, 216, 222, and 234, 236, 238, respectively. Titles 218, 216, 222, 234, 236, and 238 comprise a timestamp of when the take was recorded, although such a naming convention is not necessarily a requirement according to the present disclosure. Box 232 displays the current take selected, which in the example, is the most recently recorded take titled "4/24/19 10:01:04," indicated as 238 in chart 242 and as 222 in notepad 220. Notepad 220 indicates that take 222 has a starting measure 224 of "1A" and an ending measure 226 of "7B." The user has also inserted a comment 228 regarding take 222. The display of chart 242 corresponds to that of notepad 220. Using the same annotation convention described with regard to FIG. 9, take 238 starts at Measure 1A and stops at the middle of Measure 7B. Measure 4A was "very good" and denoted with an <open circle>, 6A was "excellent" and denoted with a <square>, 8A was "bad" and denoted with an <X>, and 5B contained an error (e.g., had a noise) and was denoted with an asterisk <*>. As shown in FIG. 9, measures "1A" through "6B' were played in full, measure "7B" (marked with a semicircle and line) was partially played, and measures "8B" and "9A" were not played. The view of score 110 can correspond to the view of chart 242 and notepad 220. In the example of FIG. 12, start bracket 204 is placed on the measure where the selected take begins, and end bracket 214 is placed on the measure where the take ends. The range of measures 212 that are played in the take are highlighted. Symbols 206, 207, 208, and 209 are shown on the score, corresponding to the open circle, square, "x," and asterisk of chart 242, respectively. Comment 210, linked to symbol 208, is shown as well.

In some embodiments, the annotations and displays 110, 220, and 242 shown in FIG. 12 are created and/or updated in real time. That is, the take listings are generated and the annotations are made as the audio is being recorded. For example, before the third take begins, the user identifies the starting measure with start bracket 204, which can be created by clicking on the starting location in score 110. Take titles 238 and 222, which can include a timestamp, are created on chart 242 and notepad 220, respectively, and starting measure 224 is recorded in notepad 220. The title and starting measure are also recorded in box 232. As the music is being played, the producer can hover over or click on a position of the score and create symbols 206, 207, 208, and 209, using the methods described above. The symbols are displayed on score 110 and on chart 242 on their respective measures. Additionally, the user can note the start of each measure at this stage of the editing process, thereby linking segments of the take to measures of the score. When the take ends, the user can identify the ending measure on score 110 with an end bracket 214. Highlight 212 can be placed over the range of measures played in the take, and the ending measure 226 can be updated on notepad 220 and in box 232. The measures played in the take are also displayed in chart 242. The user can also type general comments 228 regarding the take in notepad 220.

A user can click on maximize button 244 to enlarge the view of chart 242. In some embodiments, enlarged chart 242 displays information that does not fit in the standard size of the window. For example, when enlarged, chart 242 displays more measures and takes that would otherwise require additional scrolling to view. A larger view can make it easier for a user to determine which measures are repeatedly recorded with errors and which measures have not been recorded enough. It will be appreciated that according to the present disclosure, other windows, such as windows 110 and 220 can be resized as well, and can display more or less information depending on their respective window size.

In some embodiments, the data obtained while recording can be merged into a database of recordings after the recordings are completed. In some embodiments, the data obtained while recording can be automatically saved in the database as it is being recorded. In some embodiments, the data from all recordings can be displayed on a grid, such as grid 132 of FIG. 11. User interface 101 therefore gives the producer during the recording session a comprehensive up-to-the-minute bird's-eye view of the entire recording project, helping the producer to ensure that there is plenty of good material of all measures. It also saves the producer hours after the sessions listening through all the takes and notating what measures were recorded.

The application can allow a user to select a segment of a take for each measure. It will be appreciated that in some instances, a single take can be selected for multiple measures, or multiple takes can be selected for a single measure. For example, if no single take contains a given measure to a user's liking, a user can select one take for the first half of the measure, and another take for the second half of the measure.

On a position in the score where one selected take ends and a new selected take begins, a marker indicating a new take can be placed on the position of the score where the take begins. Information relevant to the take, such as the take name and a link to its position in a chart of takes, can also be displayed on or near the marker.

Figure 13:
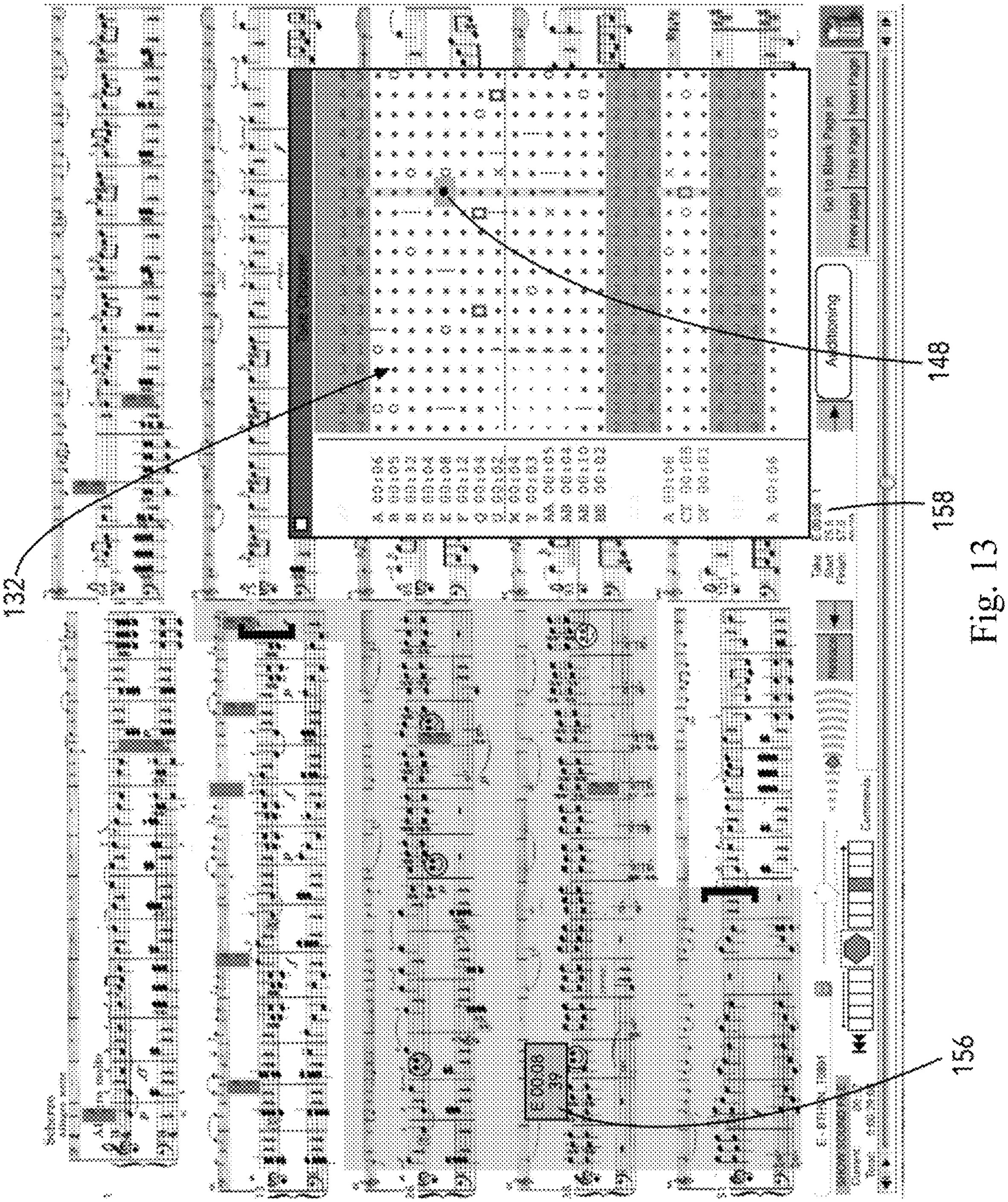
FIG. 13 illustrates an exemplary user interface for audio editing according to embodiments of the present disclosure.

FIG. 13 shows an exemplary user interface for audio editing. In some embodiments, to select a segment of a take to use for a particular measure, the user can select the desired take/measure pair 148 from chart 132, and the application will record the selection. In some embodiments, the application will display that a selection was made by annotating the score, such as with marker 156 indicating that a segment was selected. In some embodiments, marker 156 displays information regarding the selected segment, such as the take name, the measures it covers, alternate takes and comments. In some embodiments, marker 156 is configured so that when a user's cursor moves away from it, marker 156 becomes smaller so as to not clutter the user interface and view of the score. In some embodiments, marker 156 appears upon selection of a segment, and a user can place it on the score at a position of their choosing. In the example of FIG. 13, take "E 00:08" is selected for measure 39, as indicated by a highlight around take/measure pair 148. Information regarding the selected take can also be displayed in take details box 158.

In some embodiments, the application allows for segments of takes to be spliced together to create a final audio file. In some embodiments, splicing includes cross-fading two segments together. In some embodiments, cross-fading includes locating the "out" of the first segment usually at a place in the music where there is a change of note, chord and/or volume, and then locating the "in" of the 2nd segment at substantially the same place (e.g., the identical place) in the music, and then causing the volume of the first segment to fade out while the volume of the 2nd segment fades in. In some embodiments, the "out" and "in" positions can be the same as the desired start and end positions of the first and second segments, respectively. A crossfade can then be inserted between the "out" and "in" positions.

In some embodiments, the application automatically splices sequential audio segments together. In some embodiments, splicing is done manually by a user. In some embodiments, the selected segments are sent to a remote user, such as an audio engineer, who can splice the segments using specialized systems, such as a DAW. In some embodiments, splicing two audio segments is done manually by the user, but the application guides the user in performing the splicing by providing an interface for selecting an end point of the first segment, a start point for the second segment, and inserting a crossfade between the two segments.

In some embodiments, when a splice between two audio segments is made, a marker is displayed on a corresponding location in the score to indicate that segments were spliced at the position in the audio corresponding to that location. It will be appreciated that splicing can be performed any time two segments are selected for consecutive parts of the score.

In some embodiments, a crossfade is applied between two spliced audio segments. A crossfade allows for the volume of one audio segment to fade while the volume of a second audio segment increases, allowing for seamless transitions between segments of different audio recordings. In some embodiments, the volume can increase or decrease linearly between the "out" and "in" positions. However, it will be appreciated that the volume can increase or decrease following a variety of other curves, such as a parabolic, exponential, or logarithmic curve. In embodiments of the present disclosure, the fading out of the first audio segment and the fading in of the second audio segment do not need to follow the same curve. The curves that the crossfade follows can be applied automatically, or it can be selected manually by a user.

In some embodiments, the application allows a user to listen to a preview of what a given splicing and crossfade would sound like while the user is configuring the splice. For example, a user can adjust an "out" position or the curve of a volume decrease and listen to the resulting spliced audio segments prior to committing their changes and performing the splice. In some embodiments, spliced audio segments can be played automatically when an adjustment to their splicing configuration is made.

Using the methods described above, a user can assess a configuration of a splice or review an edited production by just listening to the spliced audio segments and crossfades instead of necessarily viewing the waveforms of the various audio files. However, it will be appreciated that in some embodiments, a user can also open a waveform view of the files to obtain a waveform-based interface for editing the audio.

Figure 14:
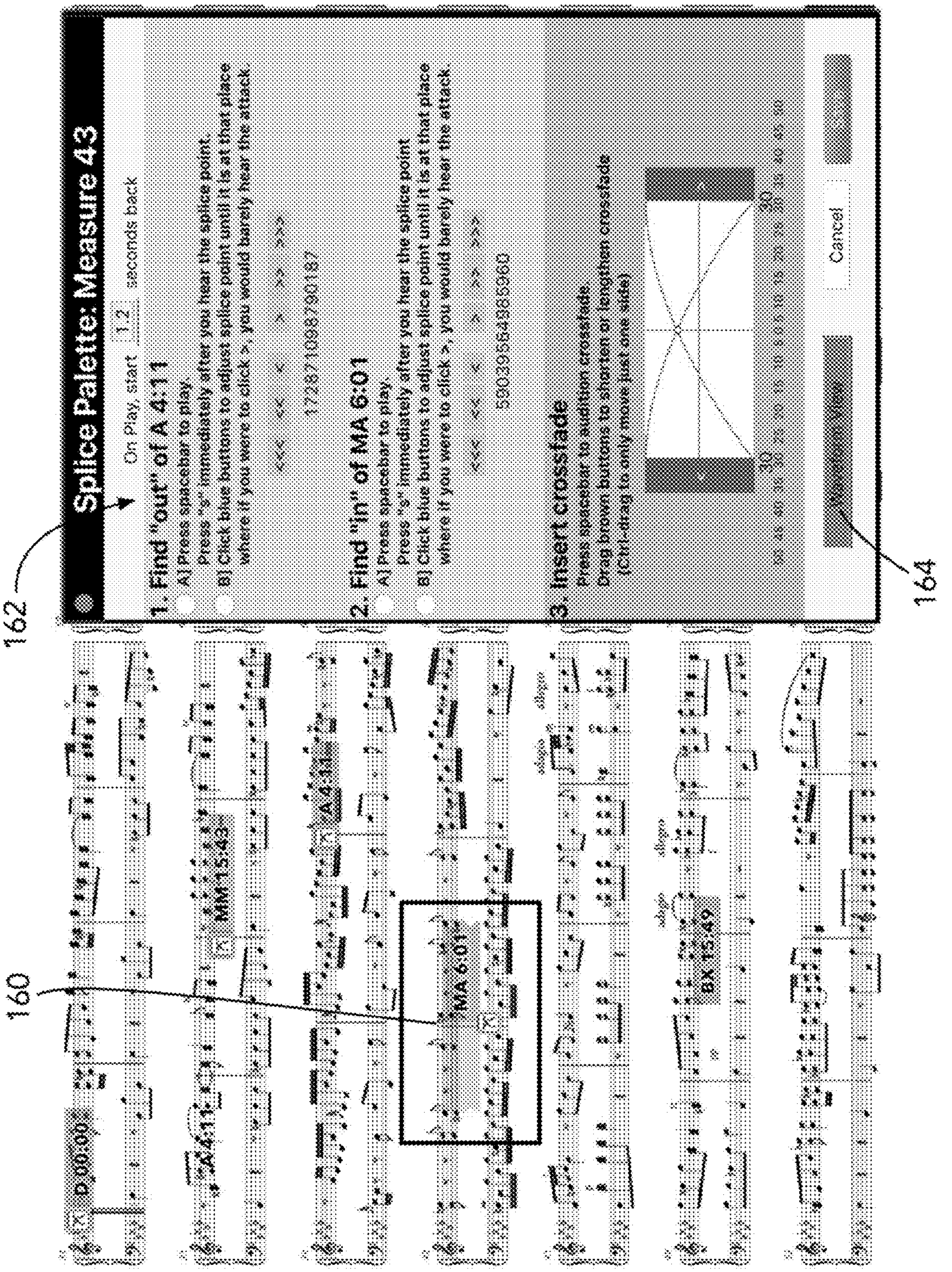
FIG. 14 illustrates an exemplary user interface for audio editing according to embodiments of the present disclosure.

FIG. 14 shows an exemplary user interface for audio editing. In the example of FIG. 14, a user has chosen to create a splice at the downbeat of measure 43 160. Splice creation GUI 162 is displayed by the application. Splice creation GUI 162 can guide the user in the creation of the splice and insertion of a crossfade. In some embodiments, splice creation GUI 162 prompts the user to select an "out" position of the first audio segment and an "in" position of the second audio segment. In some embodiments, the user can select the "in" and "out" positions by playing the respective audio file and pressing a key when the audio reaches their desired "in" or "out" position. In some embodiments, the user can select a waveform view 164, which displays the two audio files as waveforms, and the user can then select an "in" or "out" position by clicking on a location on the waveforms. A crossfade can be applied between an "in" and "out" position, and the crossfade can then be adjusted according to the methods described above.

Figure 15:
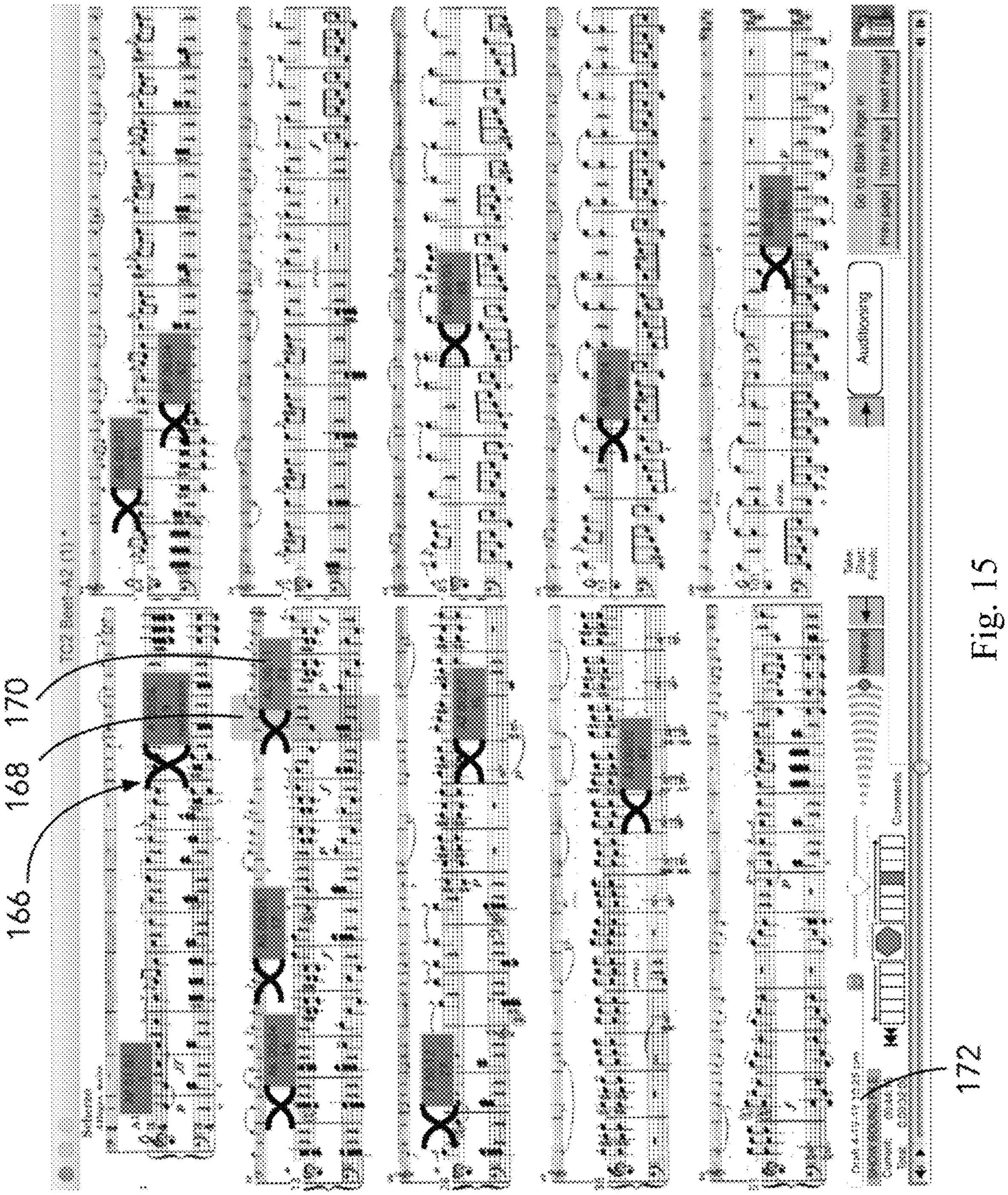
FIG. 15 illustrates an exemplary user interface for audio editing according to embodiments of the present disclosure.

FIG. 15 shows an exemplary user interface for audio editing. In some embodiments, splice marks 166 may be displayed near a segment marker on the score, indicating that a splice was created and that a new segment begins at that position on the score. In the example shown in FIG. 15, a splice is created before each new segment begins.

There are various known techniques for creating a crossfade between AudioFile1 and AudioFile2 and thus creating a new AudioFile3. Essentially, the steps are:

1.) Determine the sample number in AudioFile1 where the crossfade will begin. We will call that File1BeginningOfFade;
2.) Create a new variable FilePartOne which consists of AudioFile1 from sample number 1 to sample number File1BeginningOfFade−1;
3.) Determine the sample number in AudioFile2 where the crossfade will begin. We will call that File2BeginningOfFade;
4.) Determine the desired duration of the crossfade, measured in the number of samples. We will call that FadeSamples;
5) Create a new empty variable FilePartTwo;
6) Add to FilePartTwo the resulting data from the following pseudocode of an exemplary loop:

```
Repeat with x=1 to FadeSamples
  put x/FadeSamples into crossfadeCompletionRatio
  put crossfadeCompletionRatio*90 into XDegrees
  put (Xdegrees/360)*2*pi into XRadians
  put cos(XRadians) into xFadeOutRatio
  put sin(XRadians) into xFadeInRatio
  put xFadeOutRatio*sample (File1BeginningofFade+
    (x−1)) of AudioFile1 into
  File1DataForThisSample
  put xFadeInRatio*sample (File2BeginningofFade+
    (x−1)) of AudioFile2 into
  File2DataForThisSample
  put (File1DataForThisSample+
    File2DataForThisSample) & return after
  FilePartTwo
end repeat;
```

7.) Create a new variable FilePartThree which consists of AudioFile2 from sample number File2BeginningOfFade+FadeSamples+1 to (the number of samples in AudioFile 2)
8.) Create and save a new file AudioFile3 by attaching FilePartOne, FilePartTwo and FilePartThree.

In some embodiments, filename 172 of the current draft is displayed. In some embodiments, one or more other drafts can be loaded. In some embodiments, when the one or more other drafts may be listened to for comparison. In some embodiments, as the music is playing to a user, the currently playing measure and segment are highlighted, such as, for example, by highlighting the measure and segment marker on the score. In the example of FIG. 15, currently playing measure 168 and segment 170 are highlighted.

Figure 16:
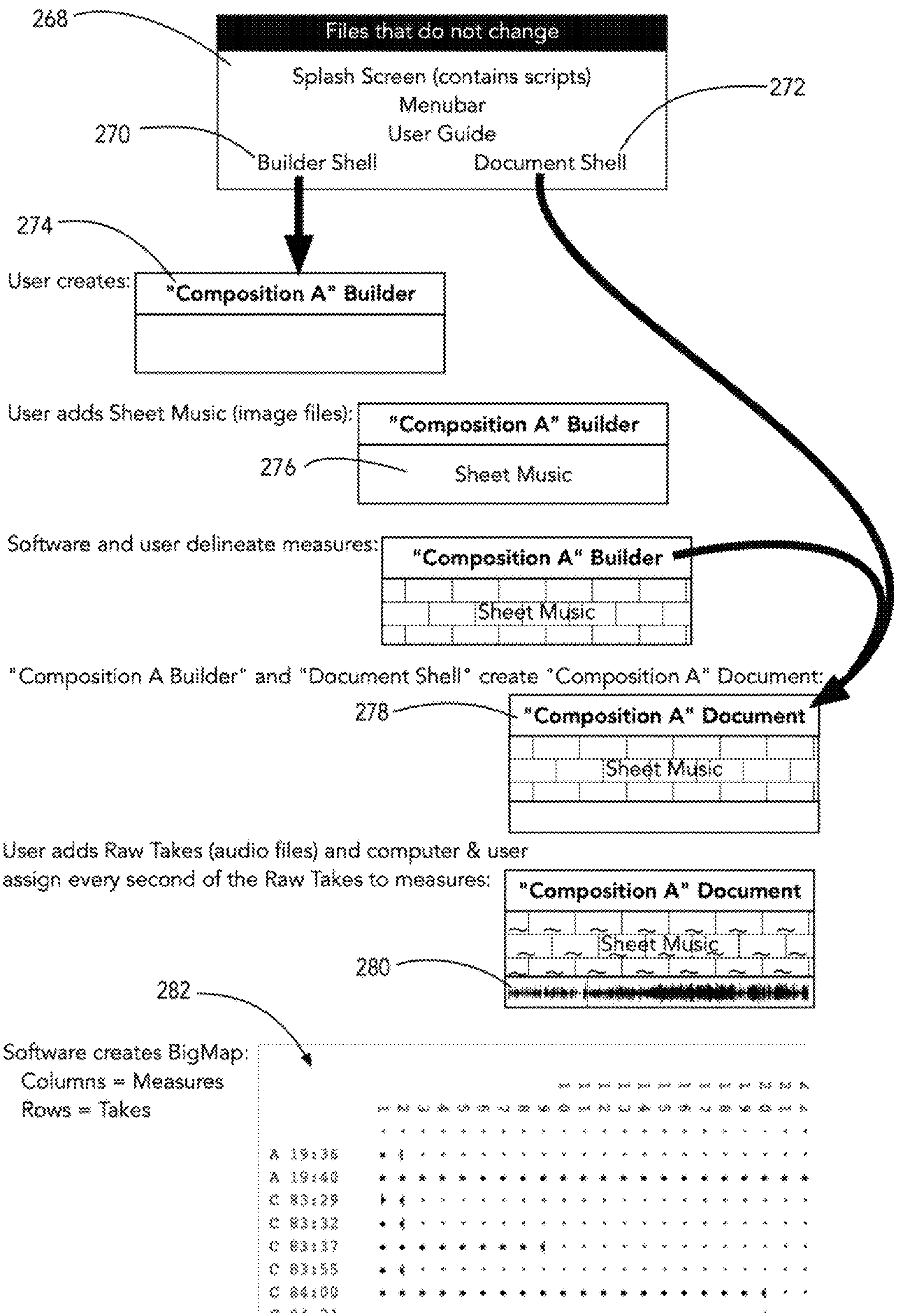
FIG. 16 illustrates a schematic view of a method for audio editing according to embodiments of the present disclosure.

FIG. 16 shows a schematic view of a method for audio editing. Audio editing application 268 is launched by the user, and various files are loaded. In various embodiments, these files may include files that are static, i.e., do not change, such as a splash screen, various scripts, menu bars and options, a user guide, builder shell 270 and document shell 272. In various embodiments, when a user clicks a button, "Composition A" Builder 274 is created based on a template document called "Builder Shell" 270. In various embodiments, the user may load reference files 276, such as scans of the sheet music, into "Composition A" Builder 274. The application and/or user reads and analyzes reference files 276 to determine divisions in the files, such as measures, bar lines, and system breaks. "Composition A" Document 278 is created based on "Composition A" Builder 274 and document shell 272. Audio files 280, which includes recorded takes of "Composition A" are loaded into "Composition A" Document 278. The application and/or user read and analyze audio files 280 and match each segment of the audio files to a set of divisions of reference files 276. For example, where reference files 276 comprise a musical score and audio files 280 comprise takes of a musical performance, each measure is matched with at least one segment of the takes. In this way, a mapping is created between each measure and segments of the takes in which the measure is played. "BigMap" 282 is created by the application, and displays each take and which measures are played in it. In some embodiments, BigMap 282 resembles a chart, where each column represents a measure, each row represents a take, and each measure/take intersection is annotated based on whether or not the measure is played in the take.

In some embodiments, the reference file is a screenplay or other script for a film. It will be appreciated that such reference files are suitable for use according to the present disclosure, using similar methods and interfaces as those described above. In such embodiments, the screenplay takes the place of the score as the visual representation of the performance, and video files take the place of audio files as the "takes" that get matched to sections of the screenplay. In some embodiments, each setting/action description or spoken line in the screenplay can be matched with at least one segment of the video recordings in which the action or line is performed. In this way, a mapping can be created from each line in the screenplay to the locations in all of the takes where the line is performed. A user can then select a desired take (or combination of takes) for each line, and splice them to create a final video file.

In some embodiments, the screenplay can be loaded into the application by a user or the application. The screenplay can be read and analyzed by the user and/or application to determine divisions between portions of the screenplay. For example, divisions may be created between each line of dialogue or description of setting or actions. A plurality of video files can be loaded into the application by the user or the application. The video files can be read and analyzed by the user and/or application, and segments of the video files can be matched with corresponding portions of the screenplay.

In some embodiments, voice recognition is used by the application to determine segments in the video files corresponding to each line of dialogue in the screenplay. Image recognition and/or natural language processing can also be used to match segments of the video files to the screenplay, such as by matching a textual description of the setting or action being performed with a still from the video file depicting the action or setting. In some embodiments, the application can differentiate between dialogue and setting/action lines. This can be performed in a variety of ways, including analyzing the font or text formatting in which the lines are written, reading metadata of the screenplay, natural language processing, or string searching for a formatting or prefix unique to dialogue or setting lines.

Using the above methods, a beginning and end of each line in the screenplay can be determined, and can be matched with a starting and ending point in at least one of the takes. It will be appreciated that the screenplay can be read and analyzed in a variety of formats, such as a text file, PDF, .doc, or .docx file. Similarly, the video files can also be read and analyzed in a variety of formats, such as .mp4, and .mov. In some embodiments, the application converts the screenplay and/or video files to a format more suitable for reading and/or analysis.

Figure 17:
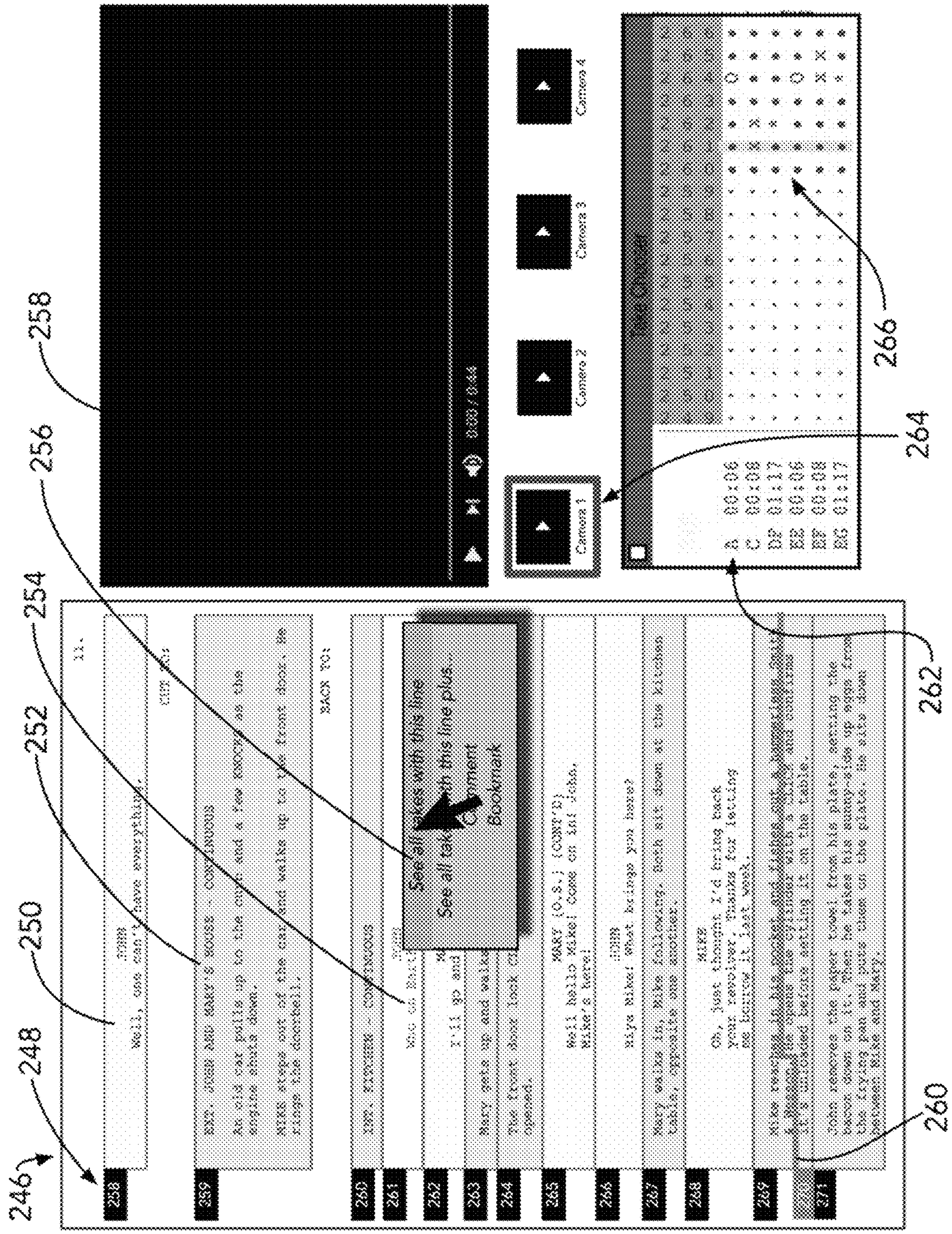
FIG. 17 illustrates an exemplary user interface for video editing based on a screenplay according to embodiments of the present disclosure.

FIG. 17 shows an exemplary user interface for video editing based on a screenplay. Screenplay 246 can be provided to the application. In some embodiments, screenplay 246 is formatted by the user and/or application to a predetermined formatting standard prior to analysis. Formatting the screenplay can comprise adjusting the margins, spacing, fonts, and/or text layout of the screenplay. In some embodiments, the application can differentiate dialog 250 and setting/action 252 based on the formatting of screenplay 246. In some embodiments, differentiation is achieved by determining whether the text in a given line is centered (and thus corresponds to dialogue) or left justified (and thus corresponds to setting/action). In some embodiments, the margins used on a given line are analyzed to determine whether it should be classified as dialogue or setting/action.

In some embodiments, based on the above analysis and other methods, such as natural language processing, the application can divide the screenplay into lines, paragraphs, or sections of paragraphs 260, and number each division with a "bit number" 248. In some embodiments, this division is performed by the user. Divided portions of the screenplay can be color coded, and the colors can indicate whether the portion comprises dialogue or setting/action.

In some embodiments, mapping the lines/bit numbers to segments of the video recordings is done by a semi-automatic process. In some embodiments, for each video file, the application receives an indication from the user of a starting and ending bit on the screenplay corresponding to the beginning and ending of the video file, respectively. The application can then analyze the dialogue between the starting and ending bits, and using voice recognition, can locate the starting and ending positions in the video file for each line of dialogue.

In some embodiments, the mapping is performed under the assumption that each setting/action bit begins after the preceding dialogue bit ends, so that there are no setting/action bits in line with a dialogue bit. The positions of setting/action bits in the video files can also be estimated by the application, and can later be edited by the user or application for more precise alignment with the frames of the video files. In some embodiments, when a user modifies the start of a setting/action bit, the application learns the correct starting position and modifies the starting position for other takes of the same bit to reflect the corrected starting position.

In some embodiments, estimating the positions of setting/action bits comprises determining a halfway point between the end of the preceding dialogue bit and the beginning of the following dialogue bit. The setting/action bit is then mapped to the halfway point. For example, the application can estimate the beginning of bit 270 260 as between the end of bit 269 and the beginning of bit 271. If at a later point, a user determines that bit 270 260 should be mapped to a position a third of the way between the end of bit 269 and the beginning of bit 271, the user can modify the start of bit 270 260 in the take currently being worked on, and the application will modify the start of bit 270 260 in the other takes in which the bit is played.

In some embodiments, chart 266 is generated by the application, displaying the takes, bits, and take/bit pairs indicating whether a bit is played in a particular take. In some embodiments, the rows and columns of chart 266 correspond to takes and bits, respectively. It will be appreciated that chart 266 and the notation used therein can be formed similarly to the chart 132 of FIG. 9, described above.

In the example of FIG. 17, the user has selected bit 261 254 in the screenplay, and a popup menu 256 was displayed to the user. The user has selected "See all takes with this line," which can cause the application to display all takes in which bit 261 254 is performed. The application can display the takes in chart 266.

In some embodiments, upon selection of a take or segment of a take by a user, the application can open player 258 and play the take or segment to the user. The application can also provide all camera angles 264 used for the take, and allow the user to select both a take and a camera angle to use for each bit in the screenplay.

It will be appreciated that the benefits of a screenplay-based video editing are similar to those for a score-based audio editing.

Embodiments of the present disclosure can exist as a standalone application or as a plugin to existing applications, such as a digital audio workstation. It will be appreciated that having the application as a plugin to an existing DAW can allow the application to use built in tools and preset interfaces included with the DAW. This can make the application easier to use for users familiar with the DAW's interfaces and functionality.

Embodiments of the present disclosure can be configured to run on a variety of systems, such as personal computers, mobile phone, and tablets. Additionally, embodiments of the present disclosure can be configured to run on a variety of operating systems, such as Windows, Linux, OSX, iOS, and Android. In some embodiments, the application is a web application.

In some embodiments, the application can maintain a log of edit history and version history of each project made within it. This can allow the application to load earlier drafts and recover from an earlier save point. In some embodiments, the application is configured to save the data of a project at automatic intervals or every time an edit is made. In some embodiments, saving a project is done manually by a user.

In some embodiments, the application can allow multiple users to collaborate on a single project. In some embodiments, users can collaborate in real time, and can make simultaneous edits on different parts of the project. In some embodiments, only one user can edit the project at a single time, and another user is able to edit the project only after the previous user has logged out of the project. In some embodiments, an administrator or project creator can restrict access to the project for certain users. For example, users can be given a variety of access privileges, such as "read only," "read and edit," and "comment only." In some embodiments, a project can be made password protected.

In some embodiments, projects are stored on a cloud based server. In some embodiments, projects are stored locally on users' computers. In some embodiments, projects are stored both locally and on a server. When edits to a project are made, the edits can be pushed to the server's copy of the project. When a user opens the project locally, the application can check the server to see if an updated version of the project exists. If it does, the application will download the updates prior to providing the project to the user for editing. A cloud configuration may be useful in certain embodiments to allow a user to download a file (e.g., a large audio file) from a remote server and work on the file locally without having to be constantly in communication with the remote server. This system may be useful for working with large files to reduce and/or minimize the bandwidth and resources required to work on a file.

According to embodiments of the present disclosure, systems, methods, and computer program products for audio editing are provided. In various embodiments, a reference file comprising musical notation is read. A plurality of measures and a plurality of notes of the musical notation are determined. A plurality of audio recordings are read where each of the plurality of audio recordings corresponds to at least a portion of the musical notation. For each of the plurality of measures of the musical notation, a corresponding segment of at least one of the plurality of audio recordings is determined. The musical notation is displayed to a user. First selections of a measure of the plurality of measures are received from the user. For each of the first selections, a listing of the plurality of audio recordings in which at least a portion of the selected measure is played is displayed to the user. For each of the first selections, a second selection of an audio recording from the listing is received from the user thereby linking the selected measure to the corresponding segment of the selected audio recording. An audio file is generated by splicing together each of the linked segments.

In various embodiments, the reference file is a musical score. In various embodiments, determining the plurality of measures and the plurality of notes comprises performing optical music recognition on the reference file. In various embodiments, determining the plurality of measures and the plurality of notes comprises identifying a location of at least one bar and at least one staff in the reference file. In various embodiments, determining the corresponding segment of the at least one of the plurality of audio recordings comprises identifying a series of notes in the segment and searching the reference file for a matching series of notes. In various embodiments, determining the corresponding segment of the at least one of the plurality of audio recordings includes providing to the user a subset of the plurality of audio recordings in which all of the plurality of measures of the reference file are played, obtaining from the user a matching of a segment of the subset of audio recordings with each of the plurality of measures, and based on the matching, determining at least one segment of the remaining audio recordings corresponding to each of the plurality of measures. In various embodiments, each of the plurality of measures and the plurality of notes of the musical notation and the corresponding segment of at least one of the plurality of audio recordings are provided to a user via a graphical user interface. In various embodiments, the method further includes automatically playing all segments of the audio recordings corresponding to a selected measure of the notation upon selection of the measure. In various embodiments, the method further includes receiving a ranking from the user of each segment of the audio recordings corresponding to a measure of the notation. In various embodiments, generating the audio file comprises generating a crossfade between adjacent selections of the user.

According to embodiments of the present disclosure, systems, methods, and computer program products for video editing are provided. In various embodiments, a reference file comprising a visual representation of recorded video media is read. A plurality of sections and a plurality of symbols in the reference file are determined. A plurality of video recordings are read where each of the plurality of video recordings corresponds to at least a portion of the reference file. For each of the plurality of sections in the reference file, a corresponding segment of at least one of the plurality of video recordings is determined. The visual representation is displayed to a user. First selections are received from the user of a section in the visual representation. For each of the first selections, a listing of the plurality of video recordings in which at least a portion of the selected section has been recorded is displayed to the user. For each of the first selections, a second selection is received from the user of a video recording from the listing thereby linking the selected section to the corresponding segment of the selected video recording. An edited video file is generated by joining together each of the linked segments.

In various embodiments, the reference file includes a screenplay. In various embodiments, the plurality of symbols includes user-defined symbols. In various embodiments, the plurality of symbols includes alphanumeric characters. In various embodiments, the plurality of symbols includes non-alphanumeric symbols. In various embodiments, the reference file includes a storyboard. In various embodiments, determining the plurality of sections comprises performing optical character recognition on the reference file. In various embodiments, determining the plurality of sections and the plurality of symbols that constitute the visual representation includes separating the visual representation into at least two sections in the reference file. In various embodiments, determining the corresponding segment of the at least one of the plurality of video recordings includes prompting the user to match one or more sections of the video recordings to one or more sections of the reference file. In various embodiments, determining the plurality of sections in the reference file includes receiving user input indicating each of the plurality of sections. In various embodiments, determining the corresponding segment of the at least one of the plurality of video recordings includes providing to the user a subset of the plurality of video recordings in which a selected section of the reference file is videotaped, obtaining from the user a matching of a segment of the subset of video recordings with each of the plurality of sections, and based on the matching, determining at least one segment of the remaining video recordings corresponding to each of the plurality of sections. In various embodiments, each of the plurality of sections and the plurality of symbols in the visual representation and the corresponding segment of at least one of the plurality of video recordings are provided to a user via a graphical user interface. In various embodiments, the method further includes receiving a selection from the user of a section of the visual representation, displaying a summary of all video recordings in which the selected section is played, receive a selection of one the of the displayed video recordings, and automatically playing a segment of the selected video recording corresponding to the selected section of the visual representation. In various embodiments, the method further includes receiving a ranking from the user of each segment of the video recordings corresponding to a section of the visual representation. In various embodiments, generating the edited video file comprises generating a new video file including the linked selected sections.

According to embodiments of the present disclosure, systems, methods, and computer program products for media editing are provided. In various embodiments, a method is provided where a reference file comprising a visual representation of the media is read (the visual representation of the media may not be the same format as the media). A plurality of sections and a plurality of symbols in the reference file are determined. A plurality of media recordings are read where each of the plurality of media recordings corresponds to at least a portion of the reference file. For each of the plurality of sections in the reference file, a corresponding segment of at least one of the plurality of media recordings is determined. The visual representation is displayed to a user. First selections are received from the user of a section in the visual representation. For each of the first selections, a listing of the plurality of media recordings in which at least a portion of the selected section has been recorded is displayed to the user. For each of the first selections, a second selection is received from the user of a media recording from the listing thereby linking the selected section to the corresponding segment of the selected media recording. An edited media file is generated by joining together each of the linked segments.

Figure 18:
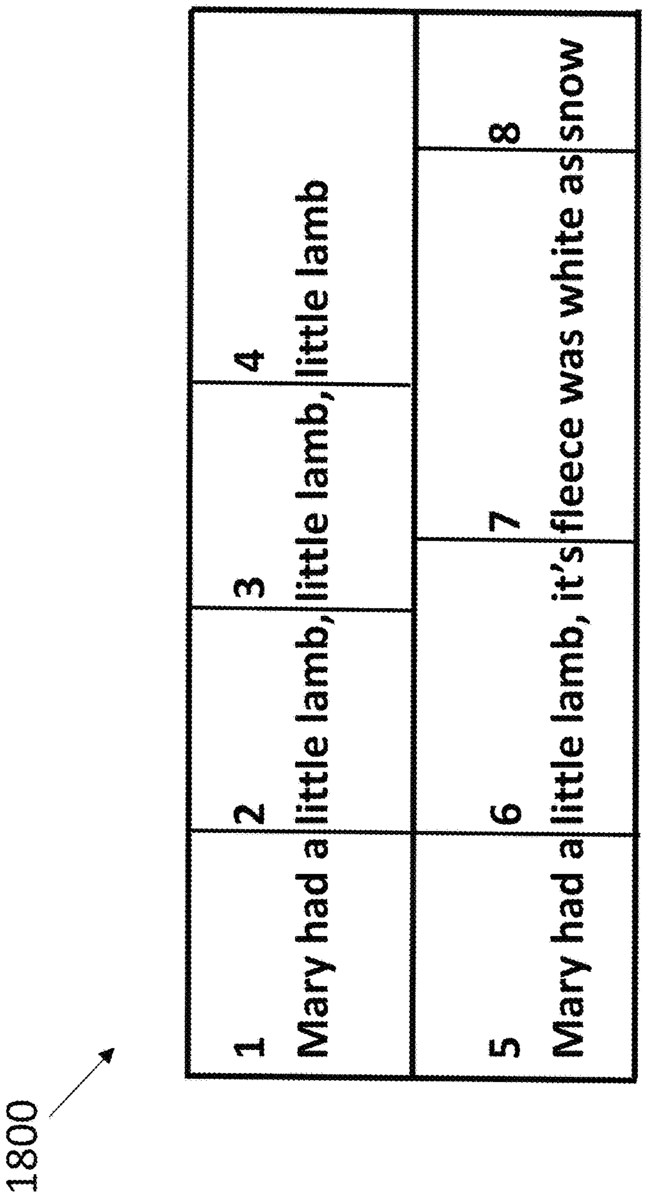
FIG. 18 illustrates an exemplary set of numbered measures according to embodiments of the present disclosure.

FIG. 18 illustrates an exemplary set of numbered measures 1800. In particular, the numbered measures 1800 include the lyrics from the song “Mary had a little lamb” totaling eight measures. In various embodiments, if the song was recorded only once, and a user clicked on a measure (e.g., measure one), the user may be presented with other locations within the song from which the same portion (e.g., measure one) could be retrieved or copied. In various embodiments, the system may perform a similarity analysis before or after the measure is selected to determine other locations within the recording where that measure may be present. In various embodiments, the system may determine that a measure is similar when the similarity analysis results in a similarity value that is above a predetermined threshold (e.g., 60%, 70%, 80%, 90%, 95%, 99%). For example, in the set of numbered measures 1800, if a user selects measure one, there is one other location (i.e., measure five) within the recording that is similar (e.g., identical) to measure one. In this example, the exact same musical notes (and words) are in measure five. In various embodiments, this feature may be particularly useful when editing, as an editor may be provided with multiple options for a particular portion that is to be integrated into a final composition. In this example, if measure one was not perfect, but measure five was perfectly played, the editor can copy measure five over to measure one. In various embodiments, repeated portions may be highlighted (in similar ways as described above) to a user, so that a user may visualize where in the recording the repetitions take place. In various embodiments, determining repetitive locations within a media recording may reduce editing time significantly.

Figure 19:
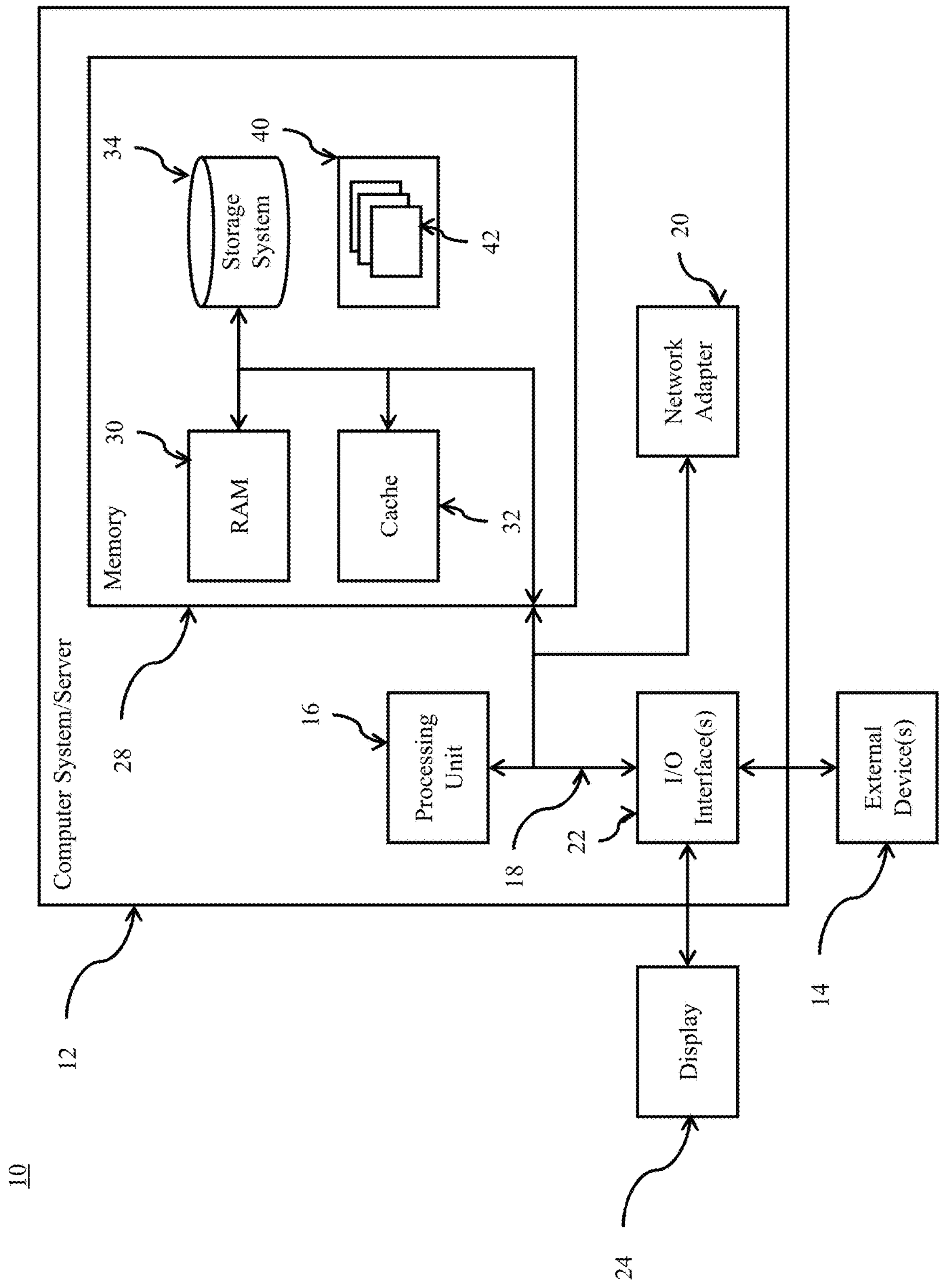
FIG. 19 depicts a computing node according to an embodiment of the present disclosure.

Referring now to FIG. 19, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for editing an audio file, the method comprising:

reading a reference file comprising musical notation;

determining a plurality of measures and a plurality of notes of the musical notation;

reading a plurality of audio recordings, wherein each of the plurality of audio recordings corresponds to at least a portion of the musical notation;

for each of the plurality of measures of the musical notation, automatically determining a corresponding segment of at least one of the plurality of audio recordings based on a series of notes in that measure, wherein automatically determining the corresponding segment of the at least one of the plurality of audio recordings comprises translating the at least one of the plurality of audio recordings into notes;

displaying to a user the musical notation;

receiving first selections from the user of a measure of the plurality of measures;

for each of the first selections, displaying to the user a listing of the plurality of audio recordings in which at least a portion of the selected measure is played;

for each of the first selections, receiving a second selection from the user of an audio recording from the listing thereby linking the selected measure to the corresponding segment of the selected audio recording;

automatically generating an audio file by splicing together each of the linked segments, wherein automatically generating the audio file comprises generating a crossfade between adjacent selections of the user.

2. The method of claim 1, wherein the reference file comprises a musical score.

3. The method of claim 1, wherein determining the plurality of measures and the plurality of notes comprises performing optical music recognition on the reference file.

4. The method of claim 1, wherein determining the plurality of measures and the plurality of notes comprises identifying a location of at least one bar and at least one staff in the reference file.

5. The method of claim 1, wherein automatically determining the corresponding segment of the at least one of the plurality of audio recordings comprises identifying a series of notes in the segment and searching the reference file for a matching series of notes.

6. The method of claim 1, wherein automatically determining the corresponding segment of the at least one of the plurality of audio recordings comprises:

providing to the user a subset of the plurality of audio recordings in which all of the plurality of measures of the reference file are played;

obtaining from the user a matching of a segment of the subset of audio recordings with each of the plurality of measures;

based on the matching, determining at least one segment of the remaining audio recordings corresponding to each of the plurality of measures.

7. The method of claim 1, wherein each of the plurality of measures and the plurality of notes of the musical notation and the corresponding segment of at least one of the plurality of audio recordings are provided to a user via a graphical user interface.

8. The method of claim 1, further comprising:

automatically playing all segments of the audio recordings corresponding to a selected measure of the notation upon selection of the measure.

9. The method of claim 1, further comprising:

receiving a ranking from the user of each segment of the audio recordings corresponding to a measure of the notation.

10. The method of claim 1, wherein automatically determining the corresponding segment of the at least one of the plurality of audio recordings comprises matching the translated notes to the series of notes in that measure.

11. A system comprising:

a server;

a computing node comprising a computer readable storage medium having program instructions embodied therewith, the program instructions executable by a processor of the computing node to cause the processor to perform a method comprising:

reading a reference file comprising musical notation;

determining a plurality of measures and a plurality of notes of the musical notation;

reading a plurality of audio recordings, wherein each of the plurality of audio recordings corresponds to at least a portion of the musical notation;

for each of the plurality of measures of the musical notation, automatically determining a corresponding segment of at least one of the plurality of audio recordings based on a series of notes in that measure, wherein automatically determining the corresponding segment of the at least one of the plurality of audio recordings comprises translating the at least one of the plurality of audio recordings into notes;

displaying to a user the musical notation;

receiving first selections from the user of a measure of the plurality of measures;

for each of the first selections, displaying to the user a listing of the plurality of audio recordings in which at least a portion of the selected measure is played;

for each of the first selections, receiving a second selection from the user of an audio recording from the listing thereby linking the selected measure to the corresponding segment of the selected audio recording;

automatically generating an audio file by splicing together each of the linked segments, wherein automatically generating the audio file comprises generating a crossfade between adjacent selections of the user.

12. A computer program product for editing an audio file, the computer program product comprising a non-transitory computer readable storage medium having program instructions embodied therewith, the program instructions executable by a processor to cause the processor to perform a method comprising:

reading a reference file comprising musical notation;

determining a plurality of measures and a plurality of notes of the musical notation;

reading a plurality of audio recordings, wherein each of the plurality of audio recordings corresponds to at least a portion of the musical notation;

for each of the plurality of measures of the musical notation, automatically determining a corresponding segment of at least one of the plurality of audio recordings based on a series of notes in that measure, wherein automatically determining the corresponding segment of the at least one of the plurality of audio recordings comprises translating the at least one of the plurality of audio recordings into notes;

displaying to a user the musical notation;

receiving first selections from the user of a measure of the plurality of measures;

for each of the first selections, displaying to the user a listing of the plurality of audio recordings in which at least a portion of the selected measure is played;

for each of the first selections, receiving a second selection from the user of an audio recording from the listing thereby linking the selected measure to the corresponding segment of the selected audio recording;

automatically generating an audio file by splicing together each of the linked segments, wherein automatically generating the audio file comprises generating a crossfade between adjacent selections of the user.

13. The computer program product of claim 12, wherein determining the plurality of measures and the plurality of notes comprises performing optical music recognition on the reference file.

14. The computer program product of claim 12, wherein determining the plurality of measures and the plurality of notes comprises identifying a location of at least one bar and at least one staff in the reference file.

15. The computer program product of claim 12, wherein automatically determining the corresponding segment of the at least one of the plurality of audio recordings comprises identifying a series of notes in the segment and searching the reference file for a matching series of notes.

16. The computer program product of claim 12, wherein automatically determining the corresponding segment of the at least one of the plurality of audio recordings comprises:

providing to the user a subset of the plurality of audio recordings in which all of the plurality of measures of the reference file are played;

obtaining from the user a matching of a segment of the subset of audio recordings with each of the plurality of measures;

based on the matching, determining at least one segment of the remaining audio recordings corresponding to each of the plurality of measures.

17. The computer program product of claim 12, wherein each of the plurality of measures and the plurality of notes of the musical notation and the corresponding segment of at least one of the plurality of audio recordings are provided to a user via a graphical user interface.

18. The computer program product of claim 12, further comprising:

automatically playing all segments of the audio recordings corresponding to a selected measure of the notation upon selection of the measure.

19. The computer program product of claim 12, further comprising:

receiving a ranking from the user of each segment of the audio recordings corresponding to a measure of the notation.

* * * * *